US010961147B2

(12) United States Patent
Bookbinder et al.

(10) Patent No.: US 10,961,147 B2
(45) Date of Patent: Mar. 30, 2021

(54) REDUCED REFLECTION GLASS ARTICLES AND METHODS FOR MAKING AND USING SAME

(71) Applicant: CORNING INCORPORATED, Corning, NY (US)

(72) Inventors: Dana Craig Bookbinder, Corning, NY (US); Jiangwei Feng, Newtown, PA (US); Timothy Michael Gross, Corning, NY (US); Dmitri Vladislavovich Kuksenkov, Elmira, NY (US)

(73) Assignee: CORNING INCORPORATED, Corning, NY (US)

(*) Notice: Subject to any disclaimer, the term of this patent is extended or adjusted under 35 U.S.C. 154(b) by 90 days.

(21) Appl. No.: 14/648,075

(22) PCT Filed: Nov. 26, 2013

(86) PCT No.: PCT/US2013/071927
§ 371 (c)(1),
(2) Date: May 28, 2015

(87) PCT Pub. No.: WO2014/085414
PCT Pub. Date: Jun. 5, 2014

(65) Prior Publication Data
US 2015/0299035 A1    Oct. 22, 2015

Related U.S. Application Data

(60) Provisional application No. 61/731,924, filed on Nov. 30, 2012.

(51) Int. Cl.
*C03C 17/00* (2006.01)
*G02B 1/118* (2015.01)

(52) U.S. Cl.
CPC ............ *C03C 17/007* (2013.01); *G02B 1/118* (2013.01); *C03C 2217/213* (2013.01);
(Continued)

(58) Field of Classification Search
CPC .. G02B 1/10; G02B 1/11; G02B 1/111; G02B 1/12; G02B 1/113; G02B 1/118;
(Continued)

(56) References Cited

U.S. PATENT DOCUMENTS 3,847,583 A    11/1974 Dislich et al.
5,189,337 A    2/1993 Endo et al.
(Continued)

FOREIGN PATENT DOCUMENTS

CN    101693519 A    4/2010
CN    102153291 A    8/2011
(Continued)

OTHER PUBLICATIONS

"Adhesion and removal of glass, silica and PSL particles from SiO2 substrates", Ph.D. dissertation by Jiangwei Feng, Department of Mechanical and Aeronautical Engineering, Clarkson University, Mar. 2001.

(Continued)

*Primary Examiner* — Cara E Rakowski
(74) *Attorney, Agent, or Firm* — Kevin M. Johnson

(57) ABSTRACT

Described herein are various articles that have anti-reflection properties, along with methods for their manufacture and use. The anti-reflection properties are imparted by way of an integral anti-reflection component on a surface of the articles. The articles exhibit a specular reflectance that is less than or equal to about 85 percent of a specular reflectance of the glass substrate alone when measured at wavelengths of
(Continued)

about 450 nanometers to about 750 nanometers. The article may also exhibit a specular reflectance of less than 4 percent across the same spectrum.

21 Claims, 25 Drawing Sheets

(52) U.S. Cl.
CPC ...... *C03C 2217/40* (2013.01); *C03C 2217/42* (2013.01); *C03C 2217/465* (2013.01); *C03C 2217/478* (2013.01); *C03C 2217/48* (2013.01); *C03C 2217/73* (2013.01); *C03C 2217/732* (2013.01); *C03C 2218/111* (2013.01)

(58) Field of Classification Search
CPC ........ G02B 1/18; G02B 27/0018; G02B 5/00; G02B 5/003; G02B 5/02; G02B 5/22; G02B 5/28; C03B 23/20; C03B 32/02; B60J 3/02; B60J 3/04; C03C 1/00; C03C 1/008; C03C 3/00; C03C 10/00; C03C 15/00; C03C 17/00; C03C 17/001; C03C 17/006; C03C 17/007; C03C 17/22; C03C 17/23; C03C 19/00; C03C 21/00; C03C 21/001; C03C 21/002; C03C 21/003; C03C 23/00; C03C 23/0005; C03C 23/007; C03C 2217/00; C03C 2217/213; C03C 2217/214; C03C 2217/40; C03C 2217/42; C03C 2217/44; C03C 2217/465; C03C 2217/47; C03C 2217/478; C03C 2217/73; C03C 2217/732; C03C 2218/111; C03C 2217/48; C23C 16/00; C23C 16/003; C23C 16/0209; C23C 16/44; B05D 5/02; B05D 2203/35; B28B 11/06; B29C 33/565; Y10T 428/265; Y10T 428/315; Y10S 977/773
USPC ........... 359/601, 613–614; 65/30.1, 33.4, 43, 65/60.1, 60.5, 60.7; 427/124, 162, 165, 427/226, 380, 407.2, 417, 442, 443; 428/410, 432–433; 977/773; 264/131
See application file for complete search history.

(56) References Cited

U.S. PATENT DOCUMENTS

| | | | |
|---|---|---|---|
| 5,492,769 | A | 3/1996 | Pryor et al. |
| 6,896,928 | B2 | 5/2005 | Allaire et al. |
| 7,842,352 | B2 | 11/2010 | Gemici et al. |
| 8,312,739 | B2 | 11/2012 | Lee et al. |
| 8,561,429 | B2 | 10/2013 | Allan et al. |
| 2006/0074172 | A1 | 4/2006 | Yang et al. |
| 2006/0121190 | A1* | 6/2006 | Tsujino ................... C03C 1/008 427/226 |
| 2008/0038458 | A1* | 2/2008 | Gemici .................. B82Y 20/00 427/180 |
| 2010/0118409 | A1 | 5/2010 | Henz |
| 2011/0146779 | A1 | 6/2011 | Chang et al. |
| 2012/0176681 | A1 | 7/2012 | Chang et al. |
| 2012/0281292 | A1* | 11/2012 | Baca ..................... C03C 17/007 359/601 |
| 2013/0135741 | A1 | 5/2013 | Lee et al. |
| 2013/0194669 | A1 | 8/2013 | Waele et al. |
| 2013/0263784 | A1 | 10/2013 | Lee et al. |
| 2013/0334031 | A1 | 12/2013 | Lee et al. |
| 2014/0113083 | A1 | 4/2014 | Lee et al. |

FOREIGN PATENT DOCUMENTS

| | | |
|---|---|---|
| CN | 101665014 A | 1/2013 |
| EP | 1167313 | 1/2002 |
| EP | 2662344 | 7/2013 |
| JP | 1994080903 A | 3/1994 |
| JP | 1994087632 A | 3/1994 |
| JP | 2000191948 A | 7/2000 |
| JP | 2001159701 A | 6/2001 |
| JP | 2001526798 A | 12/2001 |
| JP | 2002139603 A | 5/2002 |
| JP | 2005250309 A | 9/2005 |
| JP | 2006119390 A | 5/2006 |
| JP | 03930884 B2 | 6/2007 |
| JP | 2009526727 A | 7/2009 |
| JP | 2010222199 | 10/2010 |
| JP | 2012219004 | 11/2012 |
| JP | 2013083903 | 5/2013 |
| JP | 2015058605 | 3/2015 |
| WO | 2012058084 | 5/2012 |
| WO | 2015041257 | 3/2015 |

OTHER PUBLICATIONS

J.-W. Feng, A. A. Busnaina, and W. P. Ryszytiwskyj, "Effect of humidity and aging on adhesion and removal of glass particles from FPD glass", Surface Engineering, v.17, No. 5, pp. 425-429, 2001.
A. A. Busnaina, H. Lin, N. Moumen, J.-W. Feng, and J. Taylor, "Particle Adhesion and Removal Mechanisms in Post-CMP Cleaning Processes", IEEE Trans. on Semiconductor Manufacturing, V. 15, No. 4, pp. 374-382, 2002.
G. Adams, A. A. Busnaina and S. Muftu, "Particle adhesion and removal in post-CMP applications," Northeastern University Microcontamination Research lab.
X.-D. Wang, Zh.-X. Shen, J.-L. Zhang, H.-F. Jiao, X.-B. Cheng, X.-W. Ye, L.-Y. Chen, and Zh.-S. Wang, "Contact between Submicrometer Silica Spheres", Langmuir, v. 26, No. 8, pp. 5583-5586, 2010.
S.V. Patwardhan, G.E. Tilburey, and C.C. Perry, "Interactions of Amines with Silicon Species in Undersaturated Solutions Leads to Dissolution and/or Precipitation of Silica", Langmuir, v.27, No. 24, pp. 15135-15145, 2011.
G.B. Alexander, W.M. Heston, and R.K. Iler, "The solubility of amorphous silica in water", J. Phys. Chem., v.58, No. 6, pp. 453-455, 1954.
M. Tao, W. Zhou, H. Yang, and L. Chen, "Surface texturing by solution deposition for omnidirectional antireflection", Applied Phys. Lett., 91, 081118, 2007.
W. Zhou, M. Tao, L. Chen, and H. Yang, "Microstructured surface design for omnidirectional antireflection coatings on solar cells", Journ. of Applied Phys., 102, 103105, 2007.
Y. Wang, R. Tummala, L. Chen, L.Q. Guo, W. Zhou, and M. Tao, "Solution-processed omnidirectional antireflection coatings on amorphous silicon solar cells", Journ. of Applied Phys., 105, 103501, 2009.
J. Xu, Y. Yin, H. Ma, H. Ye, and X. Liu, "A novel trilayer antireflection coating using dip-coating technique", Chinese Optics Letters, v.9, No. 7, 073101, 2011.
H. Hattori, "Anti-reflection surface with particle coating deposited by electrostatic.attraction", Advanced Materials, v.13, No. 1, pp. 51-54, 2001.
Z. Gemici, H. Shimomura, R.E. Cohen, and M.F. Rubner, "Hydrothermal treatment of nanoparticle thin films for enhanced mechanical durability", Langmuir, v.24, pp. 2168-2177, 2008.
W.G.Schlaffer, C.R. Adams, and J.N. Wilson, "Aging of silica and alumina gels", Journal of Phys. Chemistry, V. 69, No. 5, pp. 1530-1536, 1965.
G. Decher, J.D. Hong, J. Schmitt, "Buildup of Ultrathin Multilayer Films by a Self-assembly Process: III. Consecutively Alternating Adsorption of Anionic and Cationic Polyelectrolytes on Charged Surfaces", Thin Solid Films, 210, pp. 831-835, 1992.
Ralph K. Iler, "The chemistry of silica", John Wiley & Sons, New York, 1979, Chapter 5 "Silica gels and powders", Sub-chapter "Hydrothermal treatments", pp. 539-554.
Herman E. Ries Jr., "Structure and sintering properties of cracking catalysts and related materials", in "Advances in catalysis and related subjects", vol. 4, ed. W.G. Frankenburg, Elsevier, 1952, pp. 87-149.

(56) References Cited

OTHER PUBLICATIONS

W.A. Weyl, "Atomistic interpretation of the mechanism of solid state reactions and of sintering", Ceramic Age, V.60, Part 51, pp. 28-38, 1952.
Patent Cooperation Treaty International Notification of Transmittal of the International Search Report and The Written Opinion of the International Searching Authority, international application No. PCT/US2013/071927: dated Mar. 13, 2014, 10 pages
International Preliminary Report on Patentability; PCT/US2013/071927; dated Jun. 11, 2015.
English Translation of JP2015545178 dated Nov. 14, 2017; 7 Pages; Japanese Patent Office.
English Translation of TW106138082 Office Action and Search Report dated Aug. 7, 2018, Taiwan Patent Office, 3 pgs.
Chinese Patent Application No. 201810709662.4, Office Action dated Oct. 14, 2020, 10 pages (English Translation Only); Chinese Patent Office.

* cited by examiner

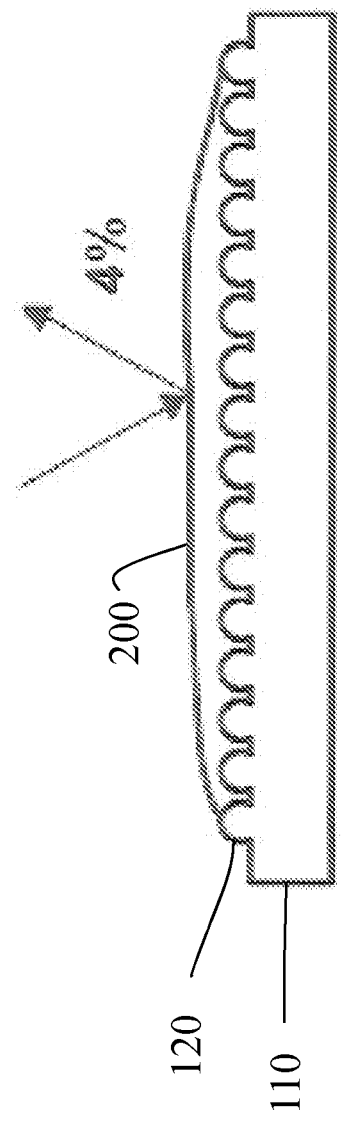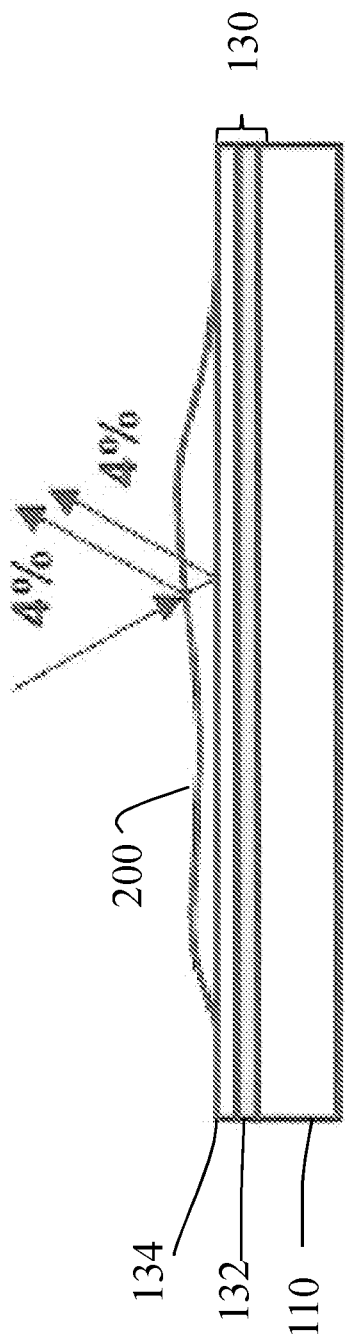

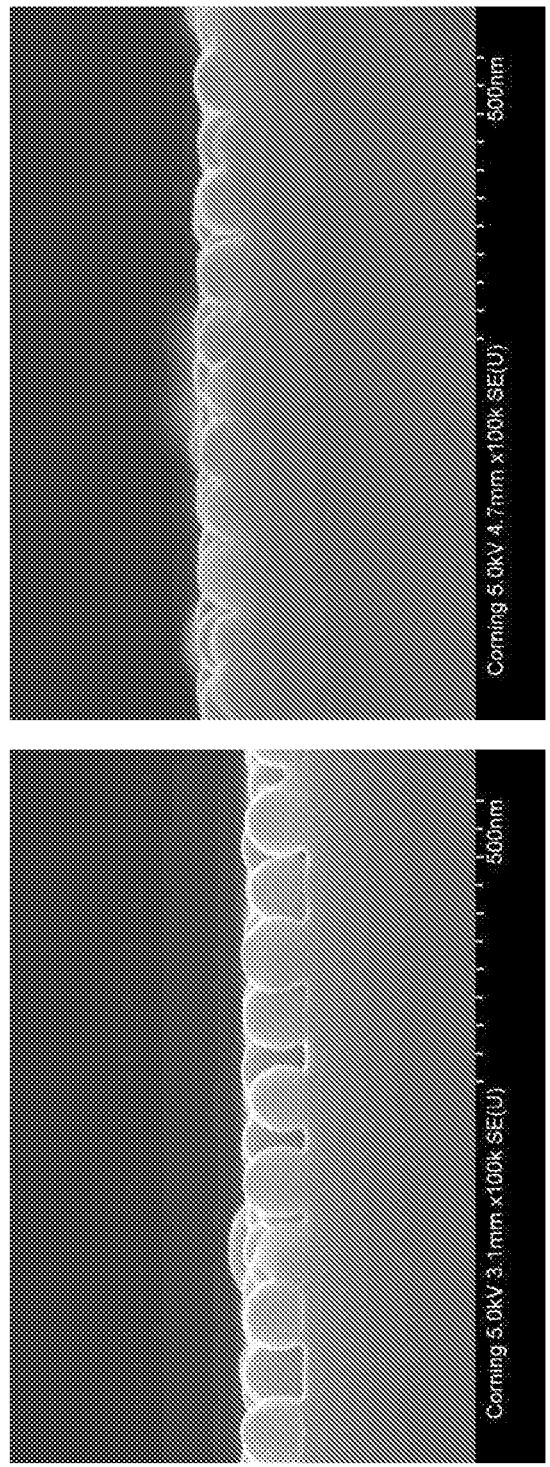

Total Reflectance

Example 5b - Three Spot Wavelength Comparison

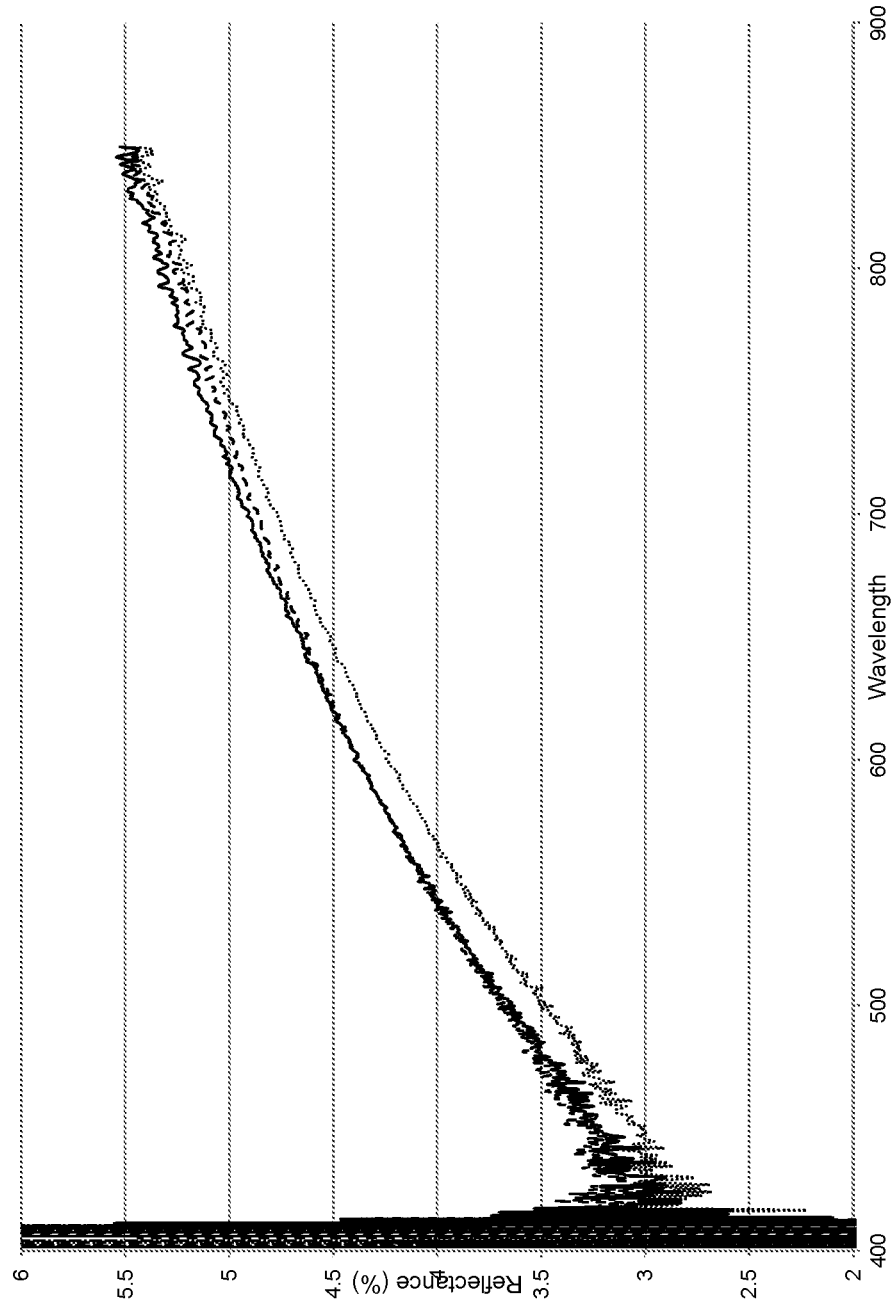

REDUCED REFLECTION GLASS ARTICLES AND METHODS FOR MAKING AND USING SAME

CROSS-REFERENCE TO RELATED APPLICATIONS

This application claims the benefit of priority under 35 U.S.C. § 371 of International Patent Application Serial No. PCT/US2013/071927 filed on Nov. 26, 2013, designating the United States of America, which the benefit of priority under 35 U.S.C. § 119 of U.S. Provisional Application Ser. No. 61/731,924 filed on Nov. 30, 2012, the content of which is relied upon and incorporated herein by reference in its entirety.

TECHNICAL FIELD

The present disclosure relates generally to reduced reflection or anti-reflection technologies. More particularly, the various embodiments described herein relate to glass articles having an integrated reduced reflection component such that the reduced reflection glass articles exhibit improved reflection resistance and durability, as well as to methods of making and using the reduced reflection glass articles.

BACKGROUND

Anti-reflection technologies are necessary in a variety of applications to reduce the reflection of light from surfaces and/or improve the transmission of light through surfaces. To illustrate, light from an external light source that is incident on a given surface can be reflected from the surface, and the reflected light image can adversely affect how well a person perceives the underlying surface and contents thereof. That is, the reflected image overlaps the image from the underlying surface to effectively reduce the visibility of the underlying surface image. Similarly, when the incident light is from an internal light source, as in the case of a backlit surface, the internal reflection of light can adversely affect how well a person perceives the surface and contents thereof. In this case, the internally reflected light reduces the amount of total light that is transmitted through the surface. Thus, reduced reflection or anti-reflection technologies are needed to minimize external and/or internal reflection of light so as to enable a surface to be seen as intended.

To combat the deleterious effects of increased reflectance and/or decreased transmission in the electronics display industry, various anti-reflection technologies have been developed. Such technologies have involved the use of adhesive films that are directly applied to the surfaces of the display screens or windows to provide reduced reflection surfaces. In certain cases, these adhesive films can be coated with additional multiple index interference coatings that prevent reflections from the screen. Unfortunately, during application of the adhesive films, air is often trapped between the display screen and the film. This results in air pockets that are unsightly and prevent the display image from being seen properly. In addition, such films can be scratched easily during use, and thus lack the durability needed to withstand prolonged use.

Rather than focus on adhesive films, alternative anti-reflection technologies have implemented coatings that are disposed directly on the display surfaces. Such coatings avoid the issues associated with air pockets being created during application, but do not necessarily provide improved durability. For example, some existing polymer-based anti-reflection coatings, such as fluorinated polymers, can have poor adhesion to glass and/or low scratch resistance. In addition, when applied to chemically-strengthened glasses, certain currently-existing coating technologies can actually decrease the strength of the underlying glass. For example, sol-gel-based coatings generally require a high-temperature curing step (i.e., greater than or equal to about 400 degrees Celsius (° C.)), which, when applied to a chemically-strengthened glass after the strengthening process, can reduce the beneficial compressive stresses imparted to the glass during strengthening. On the other hand, if the sol-gel-based coatings are applied to a glass article beforehand, the post-coating chemical strengthening may not be effective to impart the desired level of compressive stress.

There accordingly remains a need for improved anti-reflection technologies that do not suffer from the drawbacks associated with currently-existing technologies. It is to the provision of such technologies that the present disclosure is directed.

BRIEF SUMMARY

Described herein are various articles that have anti-reflection properties, along with methods for their manufacture and use. The anti-reflection properties are imparted by way of an integral anti-reflection component on a surface of the articles.

A first aspect of the present invention pertains to a reduced reflection glass article including a glass substrate and an integral reduced reflection composition on at least a portion of a surface of the glass substrate. The glass article of one or more embodiments exhibits a specular reflectance that is less than or equal to about 85 percent of a specular reflectance of the glass substrate alone when measured at wavelengths of about 450 nanometers to about 750 nanometers. In one or more embodiments, the glass article exhibits a specular reflectance of less than 4 percent across the spectrum comprising wavelengths of about 450 nanometers to about 750 nanometers. In other embodiments, the specular reflectance of the reduced reflection glass article varies by less than about 5 percent after 100 wipes using a Crockmeter from an initial measurement of the specular reflectance of the reduced reflection glass article before a first wipe using the Crockmeter. In one or more specific embodiments, the specular reflectance of the glass article varies by less than about 10 percent after 5000 wipes using the Crockmeter from an initial measurement of the specular reflectance of the reduced reflection glass article before a first wipe using the Crockmeter.

The glass article may exhibit an optical transmission of at least about 94 percent across the spectrum comprising wavelengths of about 450 to about 750 nanometers. In one or more embodiments, the glass article may exhibit a haze of less than or equal to about 1 percent when measured in accordance with ASTM procedure D1003. In other embodiments, the glass article may exhibit a scratch resistance of at least 6H when measured in accordance with ASTM test procedure D3363-05. In yet other embodiments, the glass article may include a nitrogen-dried surface.

The glass substrate utilized in the article may include silicate glass, borosilicate glass, aluminosilicate glass, or boroaluminosilicate glass. The glass substrate may optionally include an alkali or alkaline earth modifier. The glass substrate of one or more embodiments may include a surface portion extending from the surface of the glass substrate into the glass substrate that has a greater OH concentration than the remaining portion(s) of the glass substrate. In one or more embodiments, the glass substrate may have an average thickness of less than or equal to about 2 millimeters.

In one or more embodiments, the integral reduced reflection component includes a plurality of sub-wavelength-sized convex features that are arranged in a monolayer on the glass substrate surface. The plurality of sub-wavelength-sized convex features may have a spherical shape or a substantially spherical shape and may be nanoparticles comprising an oxide material.

The glass article may include an optional intermediate layer between the glass substrate and the integral reduced reflection component. The intermediate layer may include a glare-resistant coating, a color-providing composition, or an opacity-providing composition.

In one or more embodiments, the glass articles disclosed herein may form at least a portion of a touch-sensitive display screen or cover plate for an electronic device, a non-touch-sensitive component of an electronic device, a surface of a household appliance, or a surface of a vehicle component.

A second aspect of this disclosure pertains to a method of making the reduced reflection glass articles disclosed herein. In one or more embodiments, the method includes providing a glass substrate and forming an integral reduced reflection component, as described herein, on at least a portion of a surface of the substrate. The method may specifically include disposing the plurality of convex features on the surface of the glass substrate and hydrothermally treating the glass substrate to fuse the plurality of convex features to the substrate.

In one or more embodiments, hydrothermally treating the glass substrate includes placing the substrate with the plurality of convex features disposed thereon in a vessel or chamber and exposing the substrate with the plurality of convex features disposed thereon to an elevated temperature (e.g., 600 degrees Celsius or a temperature in the range from about 100 degrees Celsius to slightly below the softening temperature of the substrate glass), relative humidity (e.g., at least about 90% or an initial relative humidity of at least about 50%), and/or pressure (e.g., ambient pressure). In some embodiments, such exposure is performed in a sealed pressure vessel.

In one or more embodiments, hydrothermally treating the glass substrate with the plurality of convex features disposed thereon further may include exposing the substrate with the plurality of convex features disposed thereon to a reactive vapor, or nitrogen gas with water content of less than 1% at a temperature between the annealing point and softening point of the glass substrate.

In one or more embodiments, the method may include wetting the glass substrate and the plurality of convex features with water, a high pH solution and/or an amine solution. The method may optionally include forming an intermediate layer on at least a portion of a surface of the glass substrate, prior to forming the integral reduced reflection component. In one or more variants, the method may include disposing an easy-to-clean layer on the plurality of convex features.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 2a-2b are cross-sectional schematic illustrations of a glass substrate with convex features according to one or more embodiments and a known glass substrate with a multilayer, interference-based anti-reflective coating.

FIGS. 6a-6b are SEM images of a monolayer of silica nanoparticles having a diameter of 100 nm fused with a glass substrate in accordance with EXAMPLE 2.

FIGS. 9a-9f graphically illustrate the specular reflection spectra of various articles in accordance with EXAMPLE 4.

Figure 1:
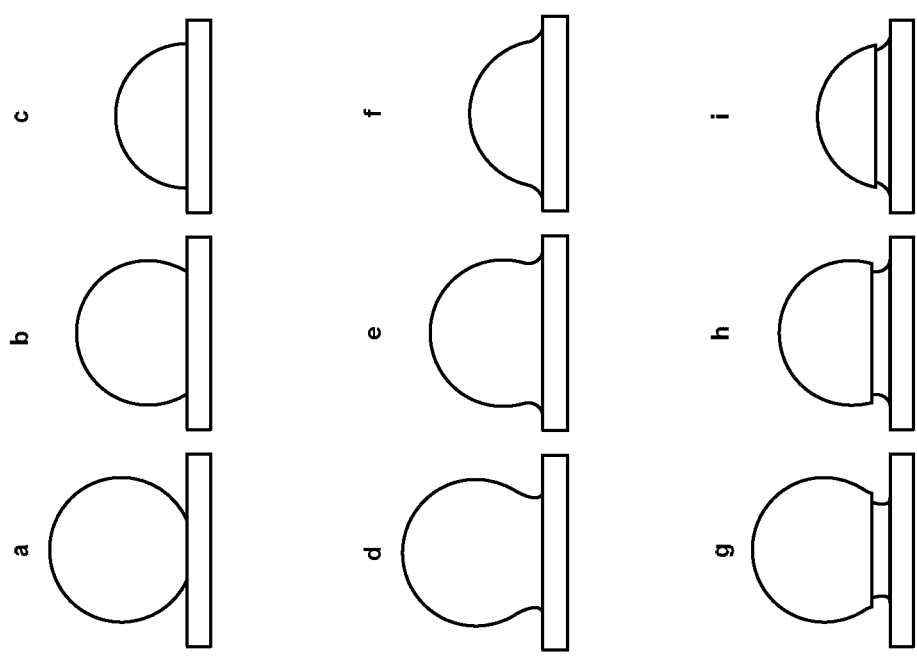
FIGS. 1a-1i are cross-sectional schematic illustrations of various convex features fused with a glass substrate surface.

These and other aspects, advantages, and salient features will become apparent from the following detailed description, the accompanying drawings, and the appended claims.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Described herein are various glass articles that have improved (lower) reflection and high durability, along with methods for their manufacture and use. As used herein, the terms "anti-reflection" or "reduced reflection" generally refer to the ability of a surface to exhibit lower specular reflectance of light that is incident to the surface in a specific spectral range of interest, when compared to the same glass articles that do not include the reduced reflection component described herein.

In general, the improved articles include a glass substrate and an integral reduced reflection component on at least a portion of a surface thereof. The integral reduced reflection component beneficially provides the articles with improved (lower) reflection in at least the range of wavelengths from about 450 nanometers (nm) to about 750 nm relative to similar or identical articles that lack the integral reduced reflection component. That is, the integral reduced reflection component serves to decrease the specular reflectance of at least a substantial portion of visible light (which spans from about 380 nm to about 750 nm) from the surface of the article. In addition, and as will be described in more detail below, the improved articles can exhibit high transmission, low haze, and high durability, among other features.

As stated above, the substrate itself is formed from a glass material. The choice of glass is not limited to a particular composition, as improved (lower) reflection can be obtained for a variety of glass substrates. For example, the material chosen can be any of a wide range of silicate, borosilicate, aluminosilicate, or boroaluminosilicate glass compositions, which optionally can comprise one or more alkali and/or alkaline earth modifiers. By way of illustration, one such glass composition includes the following constituents: 58-72 mole percent (mol %) $SiO_2$; 9-17 mol % $Al_2O_3$; 2-12 mol % $B_2O_3$; 8-16 mol % $Na_2O$; and 0-4 mol % $K_2O$, wherein the ratio $$\frac{Al_2O_3(\text{mol \%}) + B_2O_3(\text{mol \%})}{\Sigma \text{ modifiers}(\text{mol \%})} > 1,$$

where the modifiers comprise alkali metal oxides. Another illustrative glass composition includes the following constituents: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. Another illustrative glass composition includes the following constituents: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 parts per million (ppm) $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %. Another illustrative glass composition includes the following constituents: 55-75 mol % $SiO_2$, 8-15 mol % $Al_2O_3$, 10-20 mol % $B_2O_3$; 0-8% MgO, 0-8 mol % CaO, 0-8 mol % SrO and 0-8 mol % BaO. Yet another illustrative glass composition includes the following constituents: at least one of $Al_2O_3$ or $B_2O_3$ and at least one of an alkali metal oxide or an alkali earth metal oxide, wherein −15 mol %≤($R_2O$+R'O−$Al_2O_3$−$ZrO_2$)−$B_2O_3$≤4 mol %, where R can be Li, Na, K, Rb, and/or Cs, and R' can be Mg, Ca, Sr, and/or Ba. For example, one specific composition of this type includes from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. Yet another illustrative glass composition includes the following constituents: $SiO_2$, $Al_2O_3$, $P_2O_5$, and at least one alkali metal oxide ($R_2O$), wherein 0.75≤[($P_2O_5$(mol %)+$R_2O$(mol %))/$M_2O_3$ (mol %)]≤1.2, where $M_2O_3$=$Al_2O_3$+$B_2O_3$. Yet another illustrative glass composition includes the following constituents: at least about 4 mol % $P_2O_5$, wherein ($M_2O_3$(mol %)/$R_xO$ (mol %))<1, wherein $M_2O_3$=$Al_2O_3$+$B_2O_3$, and wherein $R_xO$ is the sum of monovalent and divalent cation oxides present in the glass. Still another illustrative glass composition includes the following constituents: at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0≤MgO+ZnO≤6; and, optionally, at least one of CaO, BaO, and SrO, wherein 0 mol %≤CaO+SrO+BaO≤2 mol %. Still further, another illustrative glass composition includes the following constituents: 64-71 mol % $SiO_2$; 9-12 mol % $Al_2O_3$; 7-12 mol % $B_2O_3$; 1-3 mol % MgO; and 6-11.5 mol % CaO, 0-2 mol % SrO; 0-0.1 mol % BaO; wherein 1.00≤Σ[RO]/[$Al_2O_3$] ≤1.25 where [$Al_2O_3$] is the concentration of $Al_2O_3$ and Σ[RO] is the sum of the concentrations of MgO, CaO, SrO, and BaO; and wherein the glass has at least one of the following compositional characteristics: (i) on an oxide basis, the glass comprises at most 0.05 mole percent $Sb_2O_3$; (ii) on an oxide basis, the glass comprises at least 0.01 mole percent $SnO_2$.

In one or more embodiments, the glass substrate may include alkali ions in its composition and such alkali ions may be in at least a portion of the glass substrate immediately below the surface of the glass substrate. The portion of the glass substrate with the alkali ions may comprise a layer. Without being bound by theory, it is thought that the presence of alkali ions is beneficial for the hydrothermal treatment to be effective at a faster rate and/or at lower temperature. Hydrated alkali-rich glass has a reduced melting temperature and therefore the surface layer can be melted to fuse with the nanoparticles without melting the whole substrate. Additionally or alternatively, alkali ions can combine with water molecules at the glass substrate surface, forming a strongly basic solution, which is known to be aggressive and able to dissolve the silica material of the nanoparticles, further assisting the fusion.

The glass substrate can adopt a variety of physical forms. That is, from a cross-sectional perspective, the substrate can be flat or planar, or it can be curved and/or sharply-bent. Similarly, it can be a single unitary object, or a multilayered structure or laminate. Further, the substrate optionally can be annealed and/or strengthened (e.g., by thermal tempering, chemical ion-exchange, or like processes).

The integral reduced reflection component generally includes a plurality of sub-wavelength-sized convex features that are arranged in a monolayer on at least a portion of the surface of the glass substrate so as to appear as protrusions. As used herein, the term "integral" means that the reduced reflection component is in direct physical communication with the substrate surface (or the surface of an optional intermediate layer) and that the reduced reflection component and the substrate surface (or the surface of the optional intermediate layer) are a single unitary body formed by fusion of the individual constituents of the reduced reflection component with the substrate surface (or the surface of the optional intermediate layer).

Also, as used herein, the term "sub-wavelength-sized" means that a longest cross-sectional dimension of any of the plurality of convex features is less than a lowest wavelength of light for which reflection resistance is desired. In most embodiments, the reduced reflection glass article will provide reduced reflection at least in the wavelength range from about 450 nm to about 750 nm. Thus, in these embodiments, the longest cross-sectional dimension of any of the plurality of convex features will be less than about 450 nm. In those embodiments, where reflection resistance is provided across the entire visible spectrum (i.e., about 380 nm to about 750 nm), the longest cross-sectional dimension of any of the plurality of convex features will be less than about 380 nm. In one or more specific embodiments, the longest cross-sectional dimension of any of the plurality of convex features may be in the range from about 300 nm to about 380 nm, about 310 nm to about 350 nm, about 320 nm to about 340 nm and all ranges and sub-ranges therebetween. Specific examples of the longest cross-sectional dimension of any of the plurality of convex features includes 300 nm, 310 nm, 320 nm, 330 nm, 340 nm and 350 nm.

In some embodiments, the longest cross-sectional dimension of any of the plurality of convex features may be reduced to the range between about 150 nm to about 250 nm to control or reduce haze, as described in more detail below. In some instances, the longest cross-sectional dimension of any of the plurality of convex features may be reduced to achieve a haze of less than about 6%, less than about 4%, less than about 2% or even less than about 1% per surface of the article. Specific examples of the longest cross-sectional dimension of any of the plurality of convex features may be 180 nm, 190 nm, 200 nm, 210 nm, 220 nm and 230 nm.

The term "longest cross-sectional dimension," as used herein, refers to a particular dimension of a convex feature that is parallel to the surface of the substrate. Thus, to clarify, when the convex features are spherical, the longest cross-sectional dimension is the largest diameter of any of the plurality of spherical features; when the convex features are oval-shaped, the longest cross-sectional dimension is the largest diameter of the plurality of the oval-shaped features parallel to the surface of the substrate and along the long axis of the oval; and when the convex features are irregularly-shaped, the longest cross-sectional dimension is the longest line between the two farthest opposing points on a perimeter that is parallel to the surface of the substrate for the plurality of irregularly-shaped features.

The plurality of sub-wavelength-sized convex features generally will be randomly packed on the substrate surface. Random packing means that, generally speaking, no short-range or long-range packing order is present, although a packing density (i.e., the number of features per unit area, or the surface coverage by features) is substantially uniform over the glass substrate surface. Comparing with the theoretically largest packing density represented by what is known in the field as hexagonal close packing (HCP), the surface coverage by features may be in the 50-100% range of that of the HCP, and more specifically is in the 60-90% range of that of the HCP.

In most embodiments, the plurality of sub-wavelength-sized convex features will be spherical or substantially spherical nanoparticles of an oxide material. Such materials offer durability, resistance to abrasion, and have a low index of refraction that can approximate that of the glass substrate. Examples of such materials include oxides of cerium, zirconium, aluminum, titanium, magnesium, silicon, and the like. In some embodiments, the convex features comprise a single material or a generally uniform mixture of materials; in other embodiments, the convex features include materials arranged in a core/shell configuration. When such nanoparticles are fused with the substrate surface (or the surface of an optional intermediate layer), they can adopt a variety of appearances, examples of which are shown schematically in FIG. 1. For example, one mode of nanoparticle fusion with the surface gives the appearance of "sinking" particles, such as those shown in FIG. 1a-1c. Another mode of nanoparticle fusion, which is shown in FIG. 1d-1f, gives the appearance of "necking." Still another mode of nanoparticle fusion, which is shown in FIG. 1g-1i, gives the appearance of "pawn-shaped" protrusions owing to an undercut region that is formed when a portion of the nanoparticle is dissolved into the material of the substrate surface.

It should be noted that other geometries can be obtained based on the extent of nanoparticle (or other shaped convex feature) fusion, the size of the nanoparticles, the processing conditions, and the like. For clarity, however, it is noted that the integral reduced reflection component is not formed by creating voids, pits or other shapes in the glass substrate itself. That is, the integral reduced reflection component is not a plurality of voids, pits, or other shaped depressions in the glass substrate itself, even though the appearance of such articles may be similar to the glass articles described herein. Further, the integral reduced reflection component is not formed by using an adhesive or other like material to maintain contact between the convex features and the substrate surface. That is, the integral reduced reflection component is not a plurality of convex features adhered to the substrate surface by an adhesive or other fastening means, even though the appearance of such articles may be similar to the glass articles described herein. Moreover, the plurality of convex features or nanoparticles of some embodiments are not treated to increase surface adhesion. These different articles can be distinguished from the glass articles described herein using known analytical tools such as optical microscopy, electron microscopy, microprobe analysis, and the like. Moreover, in some embodiments, one or more of the nanoparticles or other shaped convex features may be fused to one another as well as fused to the glass substrate. In some instances, the fusion between the nanoparticles or other shaped convex features may be to such a degree that at least 10%, 20%, 30%, 40%, 50%, 60%, 70%, 80%, 90% or even all of the nanoparticles or shaped convex features are fused to at least one other nanoparticle or shaped convex feature. In some specific embodiments, none of the nanoparticles or shaped convex features are isolated from (or not in contact with) the other nanoparticles or shaped convex features.

In certain embodiments, the coated articles can include a layer interposed between the glass substrate and the integral reduced reflection component. This optional intermediate layer can be used to provide additional functions or features to the article (e.g., glare resistance or anti-glare properties, color, opacity, and/or the like) with the proviso that this optional layer does not serve as an adhesive or other fastening means for the convex features of the integral reduced reflection component. Such materials are known to those skilled in the art to which this disclosure pertains.

Methods of making the above-described reduced reflection glass articles generally include the steps of providing a glass substrate, and forming the integral reduced reflection component on at least a portion of a surface of the substrate. In those embodiments where the optional intermediate layer is implemented, however, the methods generally involve an additional step of forming the intermediate layer on at least a portion of a surface of the substrate prior to the formation of the integral reduced reflection component. It should be noted that when the intermediate layer is implemented, the surface fraction of the substrate that is covered by the integral reduced reflection component does not have to be the same as the surface fraction covered by the intermediate layer.

The selection of materials used in the glass substrates, integral reduced reflection components, and optional intermediate layers can be made based on the particular application desired for the final article. In general, however, the specific materials will be chosen from those described above.

Provision of the substrate can involve selection of a glass object as-manufactured, or it can entail subjecting the as-manufactured glass object to a treatment in preparation for forming the optional intermediate layer or the nanoporous coating. Examples of such pre-coating treatments include physical or chemical cleaning, physical or chemical strengthening, physical or chemical etching, physical or chemical polishing, annealing, shaping, and/or the like. Such processes are known to those skilled in the art to which this disclosure pertains.

Once the glass substrate has been selected and/or prepared, either the optional intermediate layer or the integral reduced reflection component can be prepared.

If the optional intermediate layer is implemented, it can be fabricated using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, slot or blade coating, inkjetting, gravure coating, curtain coating, meniscus coating, sol-gel processing, or the like. Such processes are known to those skilled in the art to which this disclosure pertains.

Formation of the integral reduced reflection component generally will involve disposing the plurality of convex features on the substrate surface (or on the surface of the optional intermediate layer), and hydrothermally treating the substrate with the plurality of convex features thereon to fuse the plurality of convex features to the substrate.

The plurality of convex features can be disposed on the surface of the glass substrate or optional intermediate layer using any of a number of techniques. In general, given their nanometer-scale size, the technique will involve solution-based processes, among which include spray coating, spin-coating, dip-coating, slot or blade coating, inkjetting, gravure coating, curtain coating, or meniscus coating. Such processes are known to those skilled in the art to which this disclosure pertains. To facilitate the formation of a monolayer of the convex features with the desired orientation, the convex features and/or the substrate surface can be functionalized to modify the surface charge and enable the appropriate electrostatic interaction therebetween.

In certain embodiments, before the hydrothermal treatment, the substrate with the plurality of convex features thereon can be subjected to a wetting step, wherein the substrate and the plurality of convex features are wetted to minimize separation during, and/or to facilitate, the hydrothermal treatment. This optional wetting step can involve contacting the substrate with the plurality of convex features thereon with water, a high pH solution, an amine solution, or other like solution.

After the plurality of convex features are disposed on the surface of the glass substrate (or after the optional wetting step), the substrate with the plurality of convex features thereon can be subjected to the hydrothermal treatment to effect fusion. This can be accomplished by placing the substrate with the plurality of convex features thereon in a vessel or chamber and exposing the substrate with the plurality of convex features thereon to an elevated temperature, relative humidity, and/or pressure. In one or more embodiments, the hydrothermal treatment may be performed in furnace equipment that includes forced convection or a continuous gas (water vapor) flow.

For example, one set of conditions for the hydrothermal treatment includes a temperature of about 90 degrees Celsius (° C.) to about 99° C., a relative humidity of at least about 90%, and ambient or atmospheric pressure. Another set of conditions for the hydrothermal treatment includes a temperature in the range from about 500° C. to about 650° C., water vapor content in the gaseous chamber environment of at least 90% and ambient or atmospheric pressure In one or more embodiments, the hydrothermal treatment may be performed at or near the annealing point of the glass substrate material. In one or more specific embodiments, the hydrothermal treatment may be performed at a temperature within about 10% of the annealing point of the glass substrate. In some instances, that temperature may be in the range from about 600° C. to about 610° C. The water vapor from the high relative humidity in the chamber can serve to initiate and cause fusion between the convex features and the substrate. Without being bound by theory, the water vapor interacts with the glass substrate to break bonds within the glass substrates and allow water molecules, OH groups, or hydrogen to penetrate the material of the substrate, thereby modifying the composition of the glass substrate at the surface thereof. The portion of the glass substrate with the modified composition may be referred to as a surface layer and may exhibit a lower glass transition temperature (Tg) than the remaining portion(s) of the glass substrate (or, in other words, forms a Tg differential with the remaining portion(s) of the glass substrate). Without being bound by theory, the water vapor may also cause mobile ions in the glass substrate to diffuse to the surface and modify the chemical composition of the surface portion of the glass substrate, further reducing Tg or melting temperature. In embodiments where alkali ions are present in the glass substrate material, the alkali ions can combine with the water molecules at the substrate surface to form highly basic solutions, which are known to be aggressive and dissolve oxide glass materials such as silica, further promoting fusion by dissolving the bottom parts of the convex features into the surface layer of the substrate that has been hydrated by the hydrothermal treatment. Another set of conditions for the hydrothermal treatment includes a temperature of about 100° C. to slightly below the softening temperature of the substrate glass and an initial relative humidity of at least about 50%, wherein the treatment occurs in a sealed autoclave or other similar pressure vessel. In these, or any other, conditions, a specified amount of water can be introduced into the chamber or vessel to generate a desired amount of water vapor for the fusion to occur. In one or more embodiments, no pressure is exerted on the convex features or by the convex features (besides the weight of the convex features) to facilitate fusion between the convex features and the substrate.

In certain embodiments, the substrate with the plurality of convex features thereon can also be exposed to a reactive vapor, which can expedite the fusion process during the hydrothermal treatment. For example, some amount of base (e.g., ammonia, NaOH, or the like) or acid (e.g., HF, $H_2SO_4$, or the like) vapor can be added into the chamber. This can be done by placing an open vessel with the corresponding liquid source of the vapor in the chamber, with or without an additional heating mechanism to boil it, or boiling the liquid source of the vapor in a separate chamber or vessel and introducing it to the hydrothermal treatment chamber during the hydrothermal treatment.

Once the hydrothermal treatment is complete, the substrate with the convex features fused thereto optionally can be subjected to an additional treatment to remove any undesirable constituents from the glass surface, to increase the durability, to minimize flaws in the glass, to strengthen the glass, or the like. These treatments can include physical or chemical cleaning, physical or chemical strengthening, physical or chemical etching, physical or chemical annealing, shaping, and/or the like. Such processes are known to those skilled in the art to which this disclosure pertains.

In one or more embodiments, the substrate, the convex features and/or optional intermediate layer disposed between the substrate and the convex features, may exhibit an increased concentration of hydroxyl (OH) groups in at least a portion of the surface thereof. Without being bound by theory, the increased amount of hydroxyl groups are due to the penetration of water into the glass substrate and/or convex features. In some instances the water penetration may be present at depths of up to 1 μm, 2 μm, 3 μm, 4 μm, 5 μm, 6 μm, 7 μm, 8 μm, 9 μm or 10 μm. In some instances, the hydroxyl groups may be removed by further treatment of the substrate with the convex features and/or optional intermediate layer.

In one or more specific embodiments, a hot water washing step may be performed immediately after completion of the hydrothermal treatment. In such embodiments, the washing step using hot water dissolves small inclusions that may be formed during hydrothermal treatment. Such inclusions may include sodium oxide (or sodium hydroxide, or some form of sodium silicate) and may be present in the particulate coating. The inclusions are generally not visible under an optical microscope and difficult to detect even under an electron microscope; however, they can cause some light scattering.

In one or more embodiments, the glass substrate with convex features and/or optional intermediate layer can be further treated with dry nitrogen (i.e., gaseous nitrogen with water vapor content of below 1%, at high temperature, up to the softening point temperature of the substrate glass) to remove at least part of the water and/or hydroxyl groups by diffusion and evaporation from the surface layer of the glass substrate, after hydrothermal treatment. The resulting glass substrate with convex features and/or optional intermediate layer is nitrogen-dried or includes a nitrogen dried surface that has been hydrothermally treated and dried in nitrogen gas. In some embodiments, the treatment with dry nitrogen removes the water and/or hydroxyl groups that were introduced during hydrothermal treatment. Further treatment with dry nitrogen may be performed at 600° C. for a duration of up to 3 hours, up to 2 hours, up to 1 hour or even up to 30 minutes. In one or more embodiments, the dry nitrogen treatment may also be performed in the same furnace or heated chamber as the hydrothermal treatment; however, the gaseous environment would be modified to have less than 1% water vapor. As will be discussed below in the Examples, removal of the water and/or hydroxyl groups increases densification and/or may improve the durability of the substrate with the convex features.

In one or more embodiments, the substrate with the convex features (and/or optional intermediate layer) may be further treated with one or more "easy-to-clean" ("ETC") layers. The ETC layer(s) may be formed on top of the convex features via vacuum deposition techniques, for example, those techniques disclosed in U.S. patent application Ser. No. 13/690,829, filed on Nov. 30, 2013 and entitled "OPTICAL COATING METHOD, APPARATUS AND PRODUCT", U.S. patent application Ser. No. 13/906,065, filed on May 30, 2013 and entitled "OPTICAL COATING METHOD, APPARATUS AND PRODUCT", U.S. patent application Ser. No. 13/690,904, filed on Nov. 30, 2012 and entitled "PROCESS FOR MAKING OF GLASS ARTICLES WITH OPTICAL AND EASY-TO-CLEAN COATINGS" and U.S. patent application Ser. No. 13/906,038, field on May 30, 2013 and entitled "PROCESS FOR MAKING OF GLASS ARTICLES WITH OPTICAL AND EASY-TO-CLEAN COATINGS", the contents of which are incorporated herein by reference in their entireties. Examples of ETC materials may include for example, fluorinated silanes, typically alkyl perfluorocarbon silanes having the formula $(R_F)_x SiX_{4-x}$, where $R_f$ is a linear $C_6$-$C_{30}$ alkyl perfluorocarbon, X=Cl or —OCH$_3$— and x=2 or 3. The fluorocarbons have a carbon chain length in the range of greater than or equal to 3 nm and less than or equal to 50 nm. The fluorocarbons can be obtained commercially from vendors including, without limitation, Dow-Corning (for example fluorocarbons 2604 and 2634), 3M Company (for example ECC-1000 and 4000), Daikin Corporation, Canon, Don (South Korea), Ceko (South Korea), Cotec-GmbH (for example DURALON UltraTec) and Evonik.

In some embodiments, the treatment of the substrate with the convex features to reduce the increased concentration of water molecules and/or hydroxyl (OH) groups in the substrate, and disposing the ETC layer(s) on the convex features and/or the optional intermediate layer, may improve durability. In some embodiments, the increase in durability of such substrates is demonstrated by no damage to the structure (i.e., the adherence of the convex features to the substrate preserved) after rubbing with steel wool. The test may involve rubbing the 1×1 cm #0000 steel wool pad with 500 g load in 10 or more linear back-and-forth strokes over the surface of the substrate on which the convex features are disposed.

The glass substrate with convex features (and optional intermediate layer) may be subjected to further treatments. For example, the glass substrate with convex features (and optional intermediate layer) may be strengthened after hydrothermal treatment. For example, the glass substrate with convex features (and optional intermediate layer) may be chemically strengthened through an ion exchange process in which ions in the surface of the glass substrate are replaced by—or exchanged with—larger ions having the same valence or oxidation state. In those embodiments in which the glass substrate comprises an alkali aluminosilicate glass, ions in the surface layer of the glass and the larger ions are monovalent alkali metal cations, such as Li+ (when present in the glass), Na+, K+, Rb+, and Cs+. Alternatively, monovalent cations in the surface may be replaced with monovalent cations other than alkali metal cations, such as Ag+ or the like.

Ion exchange processes are typically carried out by immersing a glass substrate (including substrates with the convex features) in a molten salt bath containing the larger ions to be exchanged with the smaller ions in the glass substrate. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety. Further, the glass compositions of the present disclosure are down-drawable by processes known in the art, such as slot-drawing, fusion drawing, re-drawing, and the like, and have a liquidus viscosity of at least 130 kilopoise.

The compressive stress is created by chemically strengthening the glass article, for example, by the ion exchange processes, previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are preferably ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

In one or more alternative embodiments, the glass substrate with convex features may also be subjected to other ion exchange treatments to impart other attributes. One example includes ion exchanging silver ions into the glass substrate with convex features (and/or optional intermediate layer) to impart an antimicrobial property.

It will be easily understood by those skilled in the art that even for the case of 100% perfect hexagonal close packing of the convex features, they cover only about 93% of the substrate surface, and therefore 7% of the surface is directly exposed to the molten salt in the alkali or silver ion exchange bath. For non-perfect random packed convex features, between 60×0.93%=55.8% and 90×93%=83.7% of the surface may be covered by convex features, and therefore 16.3% to 44.2% of the surface is exposed to the molten salt, which means that the presence of convex features on the glass substrate surface does not substantially slow down the ion exchange process. For the case of anti-microbial treatment by silver ion exchange, the random packed convex features permit 16.3% to 44.2% of the silver-ion containing glass substrate may be exposed to the environment, preserving the strength of the anti-microbial action provided by the silver-ion containing glass.

Once the coated article is formed, it can be used in a variety of applications where the article will be viewed by a user. These applications encompass touch-sensitive display screens or cover plates for various electronic devices (e.g., cellular phones, personal data assistants, computers, tablets, global positioning system navigation devices, and the like), non-touch-sensitive components of electronic devices, surfaces of household appliances (e.g., refrigerators, microwave ovens, stovetops, oven, dishwashers, washers, dryers, and the like), vehicle components, and photovoltaic devices, just to name a few devices.

Given the breadth of potential uses for the improved articles described herein, it should be understood that the specific features or properties of a particular article will depend on the ultimate application therefor or use thereof. The following description, however, will provide some general considerations.

There is no particular limitation on the average thickness of the substrate contemplated herein. In many exemplary applications, however the average thickness will be less than or equal to about 15 millimeters (mm). If the article is to be used in applications where it may be desirable to optimize thickness for weight, cost, and strength characteristics (e.g., in electronic devices, or the like), then even thinner substrates (e.g., less than or equal to about 5 mm) can be used. By way of example, if the article is intended to function as a cover for a touch screen display, then the substrate can exhibit an average thickness of about 0.02 mm to about 2.0 mm.

The thickness of the optional intermediate layer will be dictated by its function. For glare resistance, for example, the average thickness should be less than or equal to about 200 nm. Coatings that have an average thickness greater than this could scatter light in such a manner that defeats the glare resistance properties.

In general, the optical transmittance of the article will depend on the type of materials chosen. For example, if a glass substrate is used without any pigments added thereto, the article can have a transparency over the entire visible spectrum of at least about 85%. In certain cases where the article is used in the construction of a touch screen for an electronic device, for example, the transparency of the article can be at least about 92% over the visible spectrum. In situations where the substrate comprises a pigment (or is not colorless by virtue of its material constituents), the transparency can diminish, even to the point of being opaque across the visible spectrum. Thus, there is no particular limitation on the optical transmittance of the coated article itself.

Like transmittance, the haze of the article can be tailored to the particular application. As used herein, the terms "haze" and "transmission haze" refer to the percentage of transmitted light scattered outside an angular cone of ±4.0° in accordance with ASTM procedure D1003, the contents of which are incorporated herein by reference in their entirety as if fully set forth below. For an optically smooth surface, transmission haze is generally close to zero. In those situations when the article is used in the construction of a touch screen for an electronic device, the haze of the coated article can be less than or equal to about 5%.

Regardless of the application or use, the articles described herein offer improved (lower) reflection relative to similar or identical articles that lack the integral reduced reflection component described herein. This improved (lower) reflection occurs at least over a substantial portion of the visible spectrum. In certain cases, the improved (lower) reflection occurs over the entire visible spectrum, which comprises radiation having a wavelength of about 380 nm to about 750 nm. In other cases, the improved (lower) reflection occurs for radiation having a wavelength from about 450 nm to about 1000 nm.

The reduction in reflection can be quantified by measuring the specular reflectance of the article and comparing it to that of a similar or identical article lacking the integral reduced reflection component. In general, the articles reduce the specular reflectance by at least 15% across the light spectrum of interest relative to similar or identical articles that lack the integral reduced reflection component. Stated another way, the specular reflectance of the articles are less than or equal to about 85% of that of the substrate by itself. In certain cases, however, it is possible to reduce the specular reflectance by at least 75% across the light spectrum of interest relative to similar or identical articles that lack the integral reduced reflection component described herein.

In general, the article will have a specular reflectance of less than about 4% across the entire visible light spectrum. In some cases, however, the article can have a specular reflectance of less than about 3%, 2% or even 1% across the entire visible light spectrum.

In one or more embodiments, the article may exhibit reduced visibility of fingerprints or other surface contamination that includes oil. As illustrated in FIG. 2A, an article 100 that includes the convex features 120 on the substrate 110 may eliminate reflection from the surface of the glass substrate on which the convex features are integral. Accordingly, the only reflective surface remaining is the oil surface and thus, the total reflection is reduced. For comparison, a glass substrate 110 with a multilayer, interference-based anti-reflective coating 130 (e.g., with a high refractive index layer 132 and a low refractive index layer 134) is shown in FIG. 2B. The multilayer, interference based anti-reflective coating 130 does not eliminate the light reflection from the surface of the glass substrate 110 and thus, when combined with the reflection from the oil surface, the total reflection is twice as much as the reflection of the glass substrate with the convex features 120 shown in FIG. 2A. In other words, the glass substrate with the convex features according to one or more of the embodiments disclosed herein reduces the visibility of fingerprints and other oil-containing surface contamination by 2 times as compared to glass substrates with multilayer interference based anti-reflective coatings.

The articles described herein are capable of exhibiting high durability. Durability (also referred to as Crock Resistance) refers to the ability of the article to withstand repeated rubbing with a cloth. The Crock Resistance test is meant to mimic the physical contact between garments or fabrics with an article and to determine the durability after such treatment.

A Crockmeter is a standard instrument that is used to determine the Crock resistance of a surface subjected to such rubbing. The Crockmeter subjects an sample to direct contact with a rubbing tip or "finger" mounted on the end of a weighted arm. The standard finger supplied with the Crockmeter is a 15 millimeter (mm) diameter solid acrylic rod. A clean piece of standard crocking cloth is mounted to this acrylic finger. The finger then rests on the sample with a pressure of 900 g and the arm is mechanically moved back and forth repeatedly across the sample in an attempt to observe a change in the durability/crock resistance. The Crockmeter used in the tests described herein is a motorized model that provides a uniform stroke rate of 60 revolutions per minute. The Crockmeter test is described in ASTM test procedure F1319-94, entitled "Standard Test Method for Determination of Abrasion and Smudge Resistance of Images Produced from Business Copy Products," the contents of which are incorporated herein by reference in their entirety.

Crock resistance or durability of the articles described herein is determined by optical (e.g., reflectance, haze, or transmittance) measurements after a specified number of wipes as defined by ASTM test procedure F1319-94. A "wipe" is defined as two strokes or one cycle, of the rubbing tip or finger.

In certain implementations, the reflectance of the articles described herein varies by less than about 15% after 100 wipes from an initial reflectance value measured before wiping. In some cases, after 1000 wipes the reflectance of the articles varies by less than about 15% from the initial reflectance value, and, in other embodiments, after 5000 wipes the reflectance of the articles varies by less than about 15% from the initial reflectance value.

The articles described herein are also capable of exhibiting high scratch resistance or hardness. The scratch resistance or hardness is measured using ASTM test procedure D3363-05, entitled "Standard Test Method for Film Hardness by Pencil Test," with a scale ranging from 9B, which represents the softest and least scratch resistant type of film, through 9H, which represents the hardest and most scratch resistant type of film. The contents of ASTM test procedure D3363-05 are incorporated herein by reference in their entirety as if fully set forth below. The articles described herein generally have a scratch resistance or hardness of at least 2H. In certain implementations, the scratch resistance or hardness can be at least 6H.

The various embodiments of the present disclosure are further illustrated by the following non-limiting examples.

EXAMPLES

Example 1

Fabrication of Reduced Reflection Articles

Figure 3B:
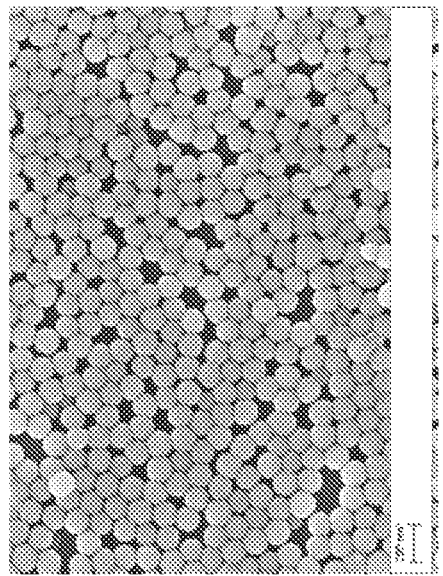
FIGS. 3a and 3b are scanning electron microscope (SEM) images of a monolayer of silica nanoparticles disposed on a glass substrate in accordance with EXAMPLE 1.
Figure 3A:
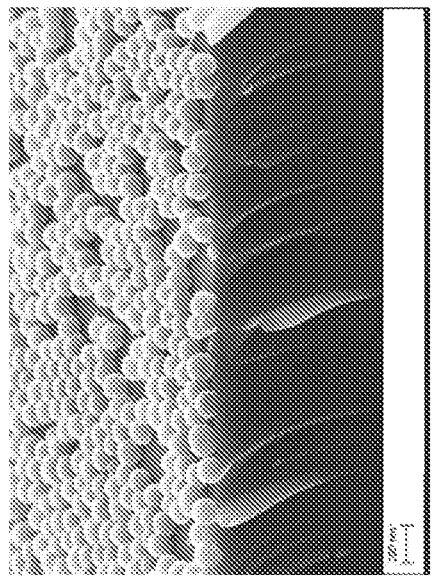

2×2" samples of 0.7 mm thick glass substrate having a composition including 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤$MgO$≤7 mol %; and 0 mol %≤$CaO$≤3 mol %, were coated with a randomly packed monolayer of 100 nm diameter silica spheres by dip-coating from a 3% colloidal solution in isopropyl alcohol (IPA) Representative scanning electron microscope (SEM) images of these samples are shown in FIG. 3a-3b.

Figure 4B:
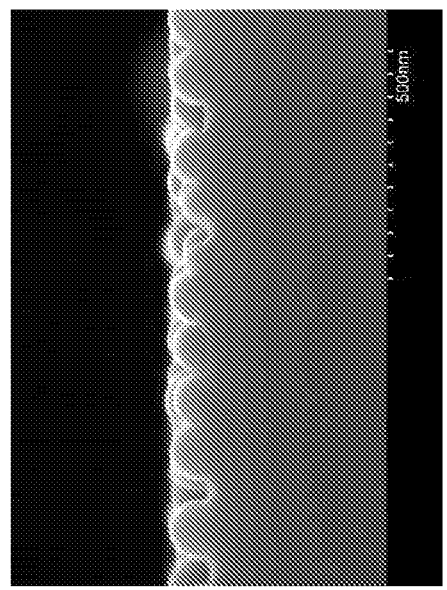
FIGS. 4a-4c are SEM images of a monolayer of silica nanoparticles fused with a glass substrate in accordance with EXAMPLE 1.
Figure 4A:
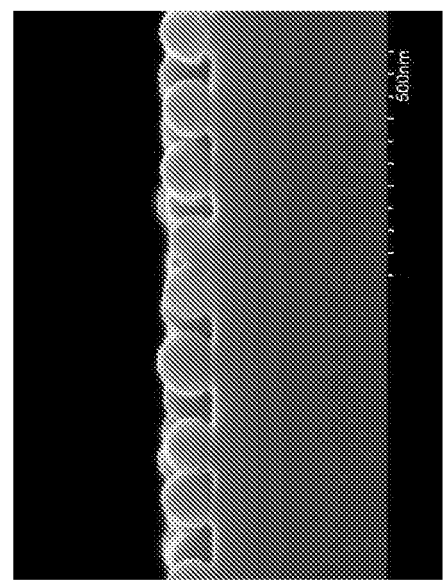
Figure 4C:
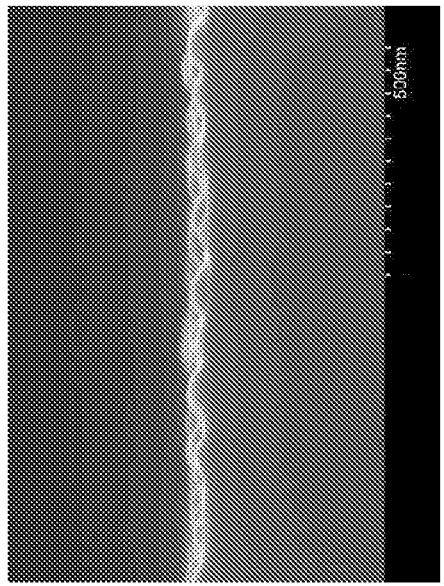

Next, these samples were placed in a furnace filled with water vapor at about 600° C. (steam), at normal atmospheric pressure. Two samples were withdrawn at each whole hour, from 1 to 7 hours. Once out of the furnace and cooled down to room temperature, top-view and cross-sectional SEM images were taken. Representative SEM images are shown in FIG. 4a-4c. As can be seen from FIG. 4, significant and fast fusion is taking place. Within the first two hours in steam, particles sink/dissolve into the glass almost up to one-half of their diameter, and within 7 hours, the resulting surface is nearly flat. Second, at least for the process conditions of this example, with about 100% water vapor environment in the chamber, particles fuse to the glass but not only do not fuse together, but even develop small spaces or gaps where they were touching each other before the hydrothermal treatment.

Figure 5A:
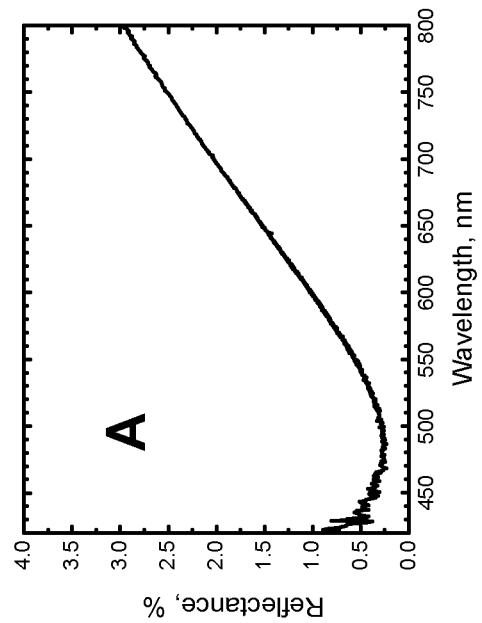
FIGS. 5a-5c graphically illustrates the specular reflectance of various articles in accordance with EXAMPLE 1.
Figure 5B:
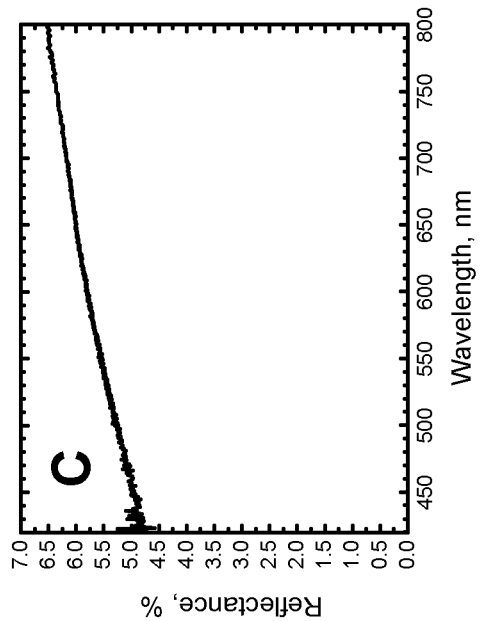
Figure 5C:
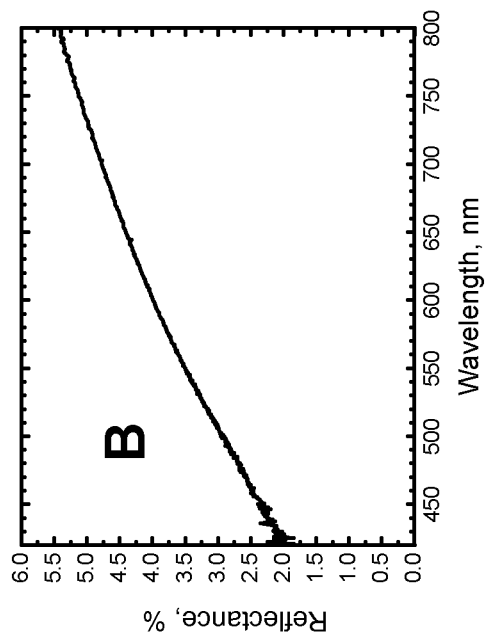

FIG. 5a-5c present reflection spectra for the samples after 1, 2, and 7 hours in 600° C. steam, respectively.

Example 2

Fabrication of Reduced Reflection Articles

Two 2×2" samples of 0.7 mm thick glass substrates having the same composition as Example 1 were coated with a randomly packed monolayer of 100 nm diameter silica spheres by dip-coating from a 3% colloidal solution in IPA. One sample was hydrothermally treated with water vapor at about 600° C. (steam), at normal atmospheric pressure for 1 hour and the other sample was hydrothermally treated with water vapor at about 600° C. (steam) for two hours. Representative scanning electron microscope (SEM) images of the samples are shown in FIG. 6a-6b. FIG. 6a shows the sample after 1 hour of hydrothermal treatment and FIG. 6b shows the sample after 2 hours of hydrothermal treatment.

Figure 7A:
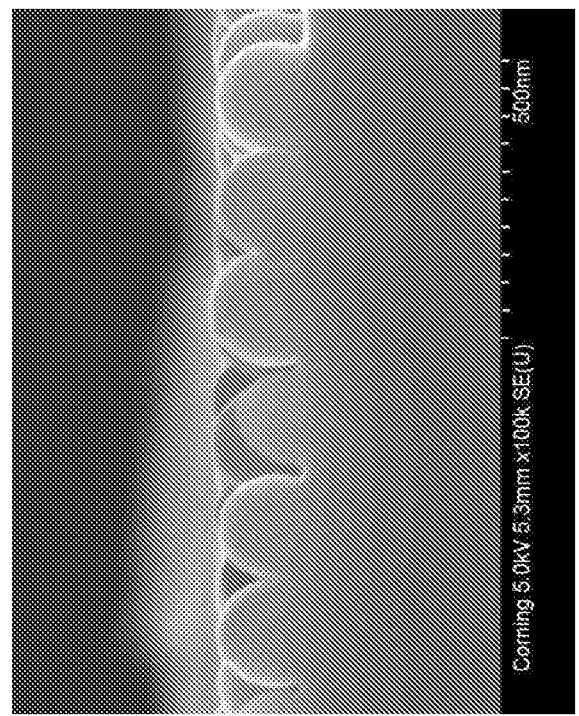
FIGS. 7a-7b are SEM images of a monolayer of silica nanoparticles having a diameter of 200 nm fused with a glass substrate in accordance with EXAMPLE 2.
Figure 7B:
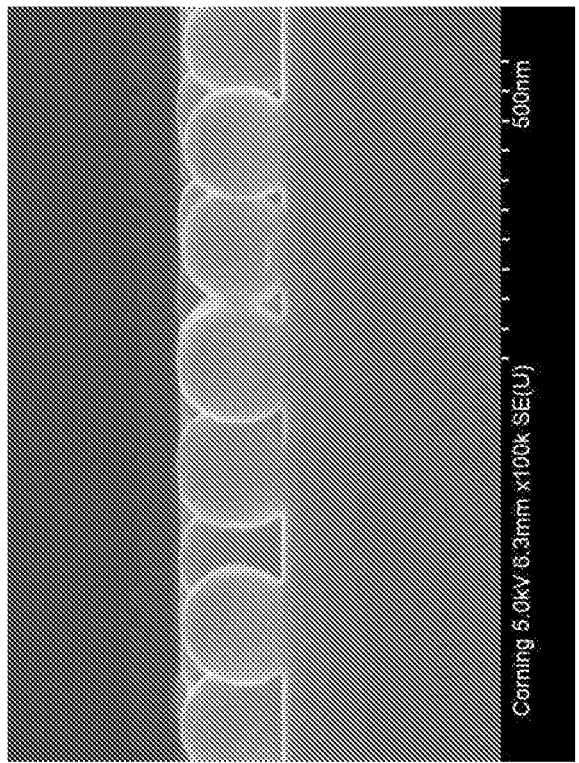

Two 2×2" samples of 0.7 mm thick glass substrates having the same composition as the glass substrates of Example 1 were coated with a randomly packed monolayer of 200 nm diameter silica spheres by dip-coating from a 10% colloidal solution in IPA One sample was hydrothermally treated with water vapor at about 600° C. (steam), at normal atmospheric pressure for 1 hour and the other sample was hydrothermally treated with water vapor at about 600° C. (steam) for two hours. Representative scanning electron microscope (SEM) images of the samples is shown in FIG. 7a-7b. FIG. 7a shows the sample after 1 hour of hydrothermal treatment and FIG. 7b shows the sample after 2 hours of hydrothermal treatment.

As shown in FIGS. 6a-6b and FIGS. 7a-7b, the hydrothermal treatment achieves fusion for particles of different sizes. In some cases, as shown in FIGS. 7a-7b, the hydrothermal treatment appears to produce a more pronounced change in the effective thickness of the truncated particle layer (or the thickness of the particle layer that remains above the surface of the underlying glass substrates) and thus achieve the higher speed of fusion, where the particles have a larger diameter. In other words, the hydrothermal treatment achieves faster fusion (and reduces the thickness of the truncated particle layer more) where the particles have a larger diameter than where the particles have a smaller diameter.

Example 3

Fabrication of Reduced Reflection Articles

Figure 8:
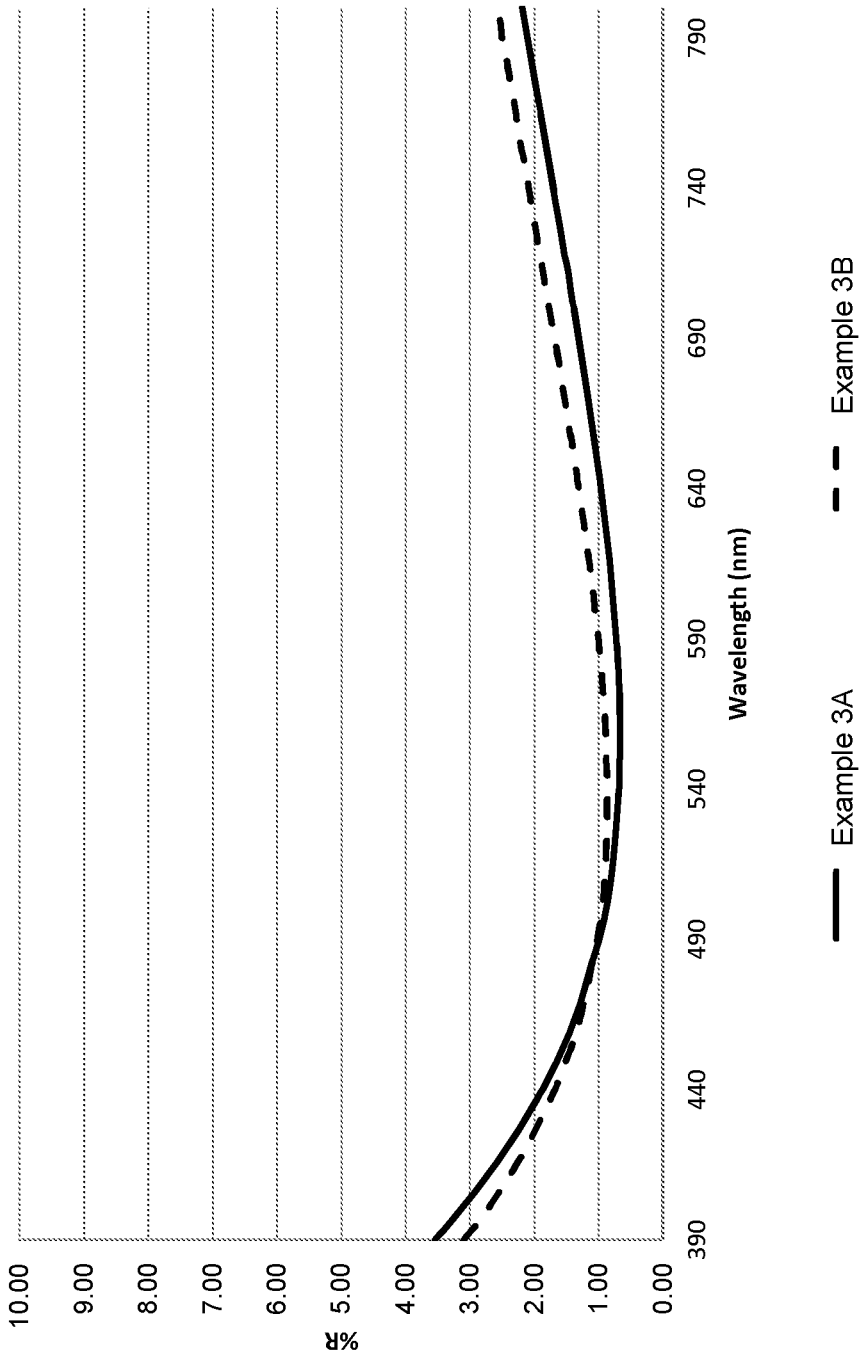
FIG. 8 graphically illustrates the total (the sum of specular and diffuse) reflectance spectra of various articles in accordance with EXAMPLE 3.
Figure 9A:
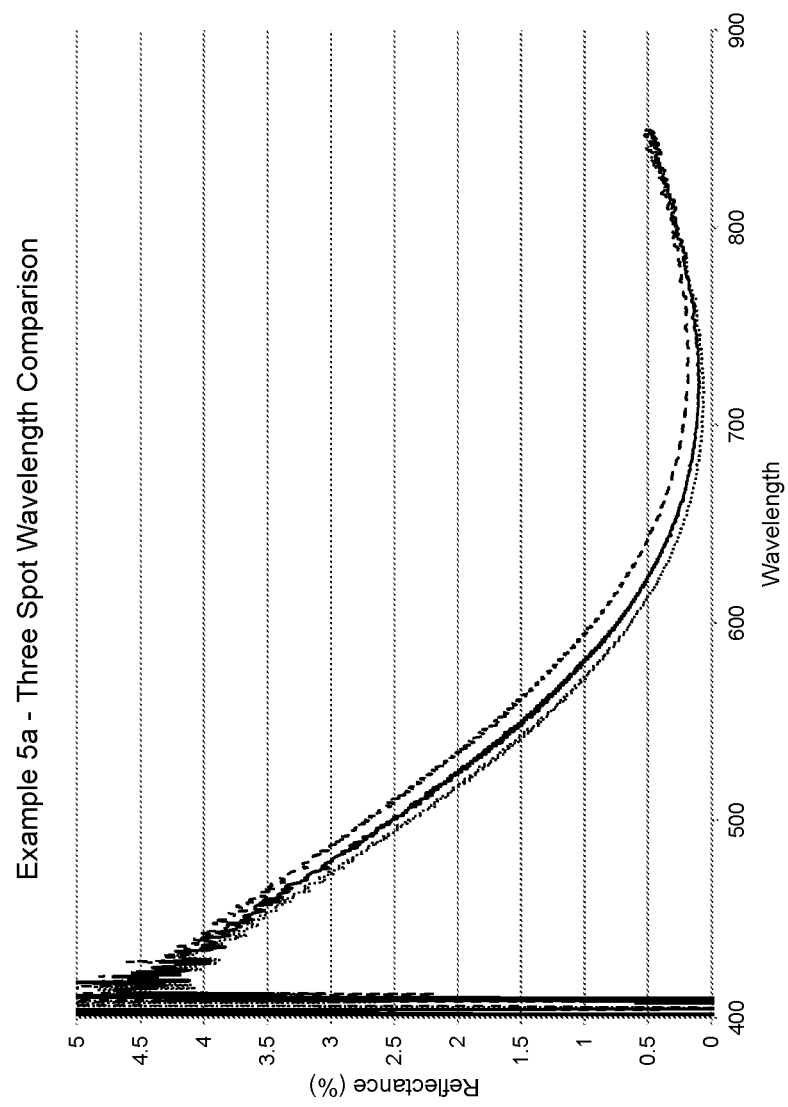
Figure 9B:
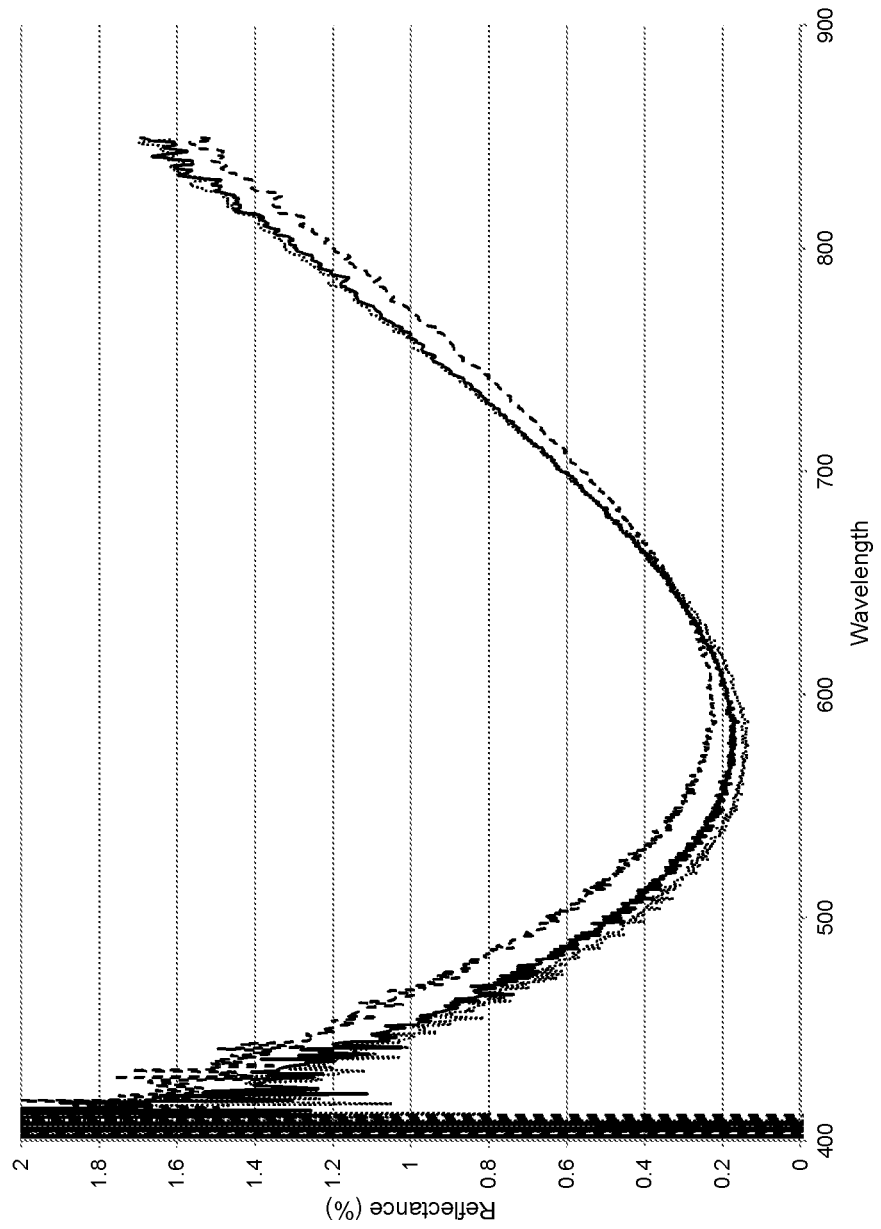
Figure 9C:
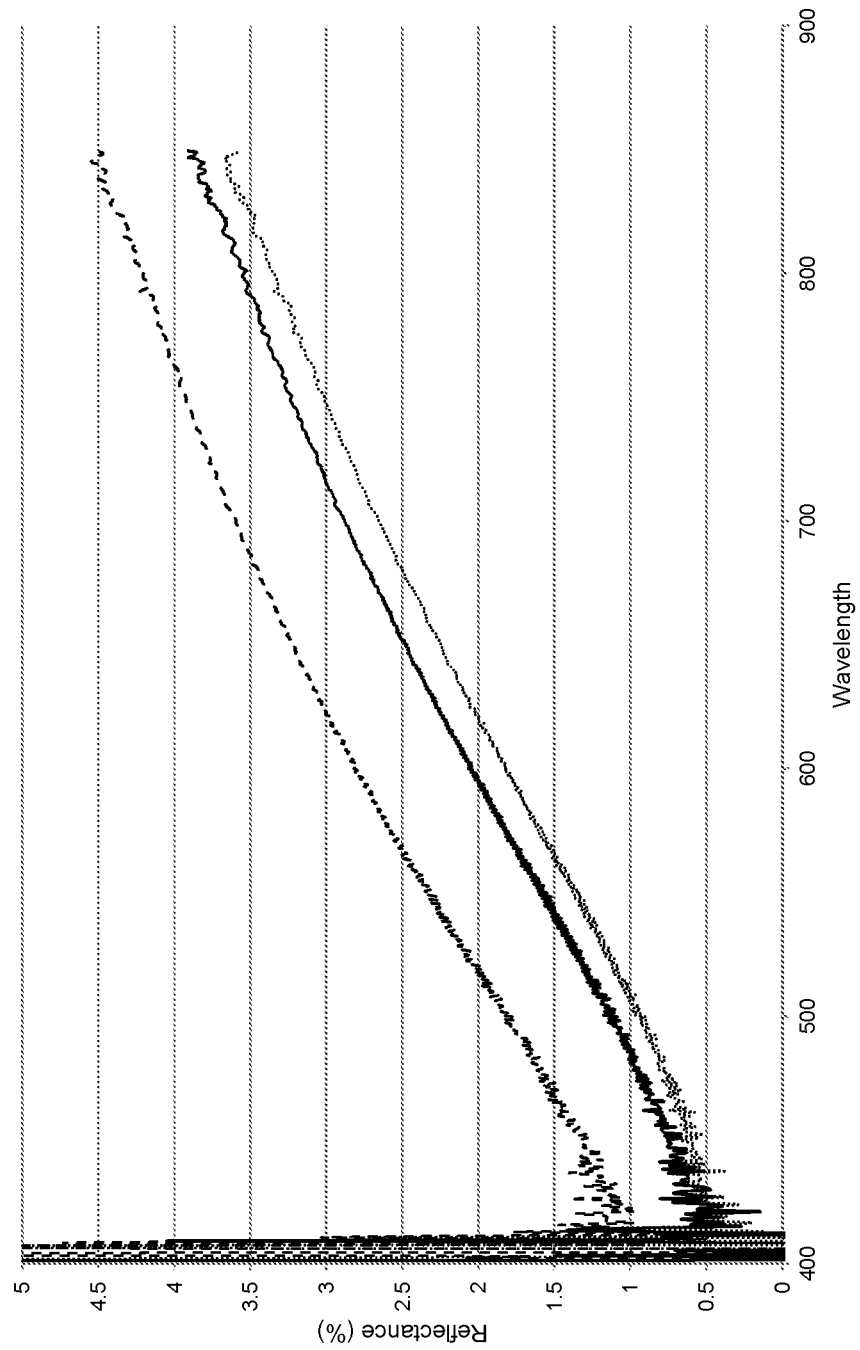
Figure 9E:
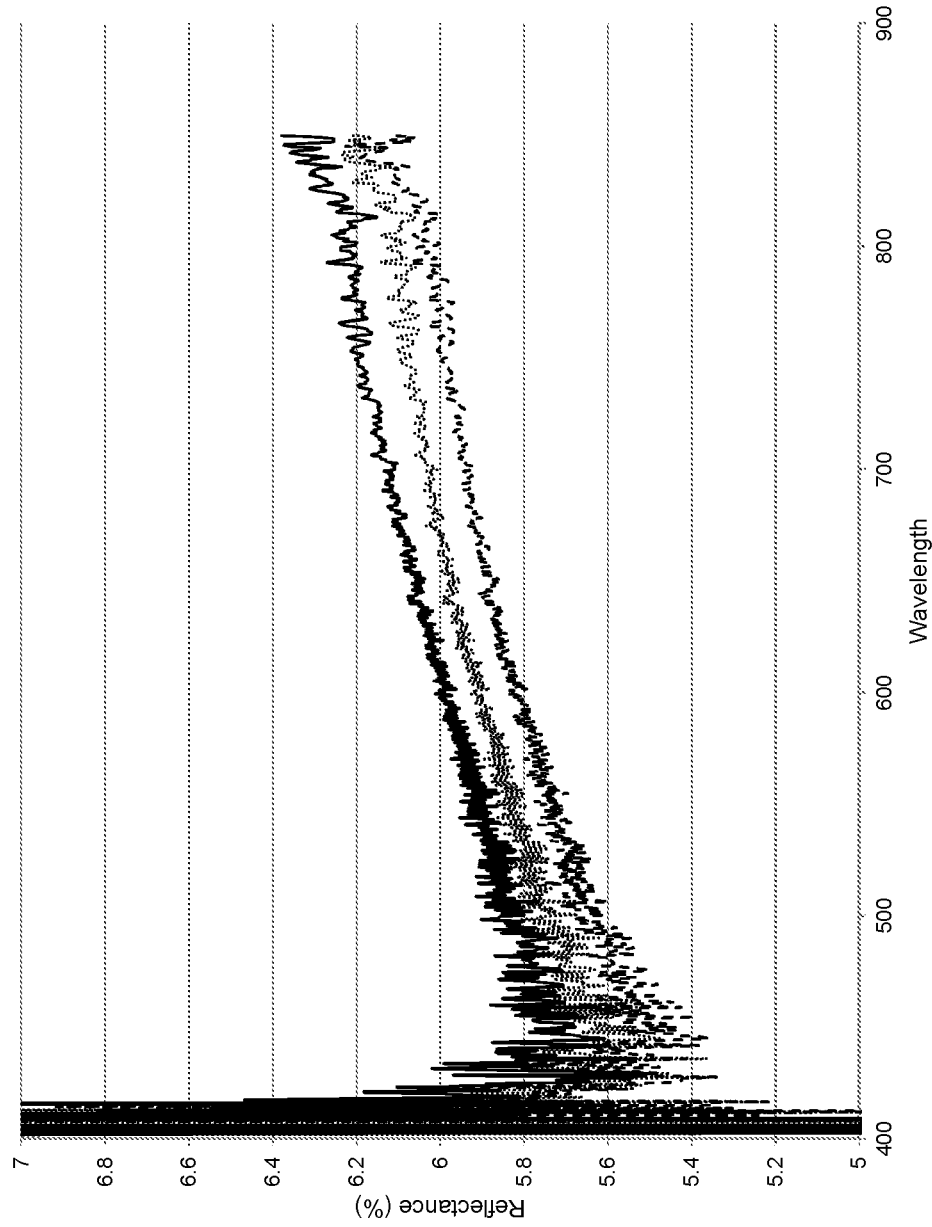
Figure 9F:
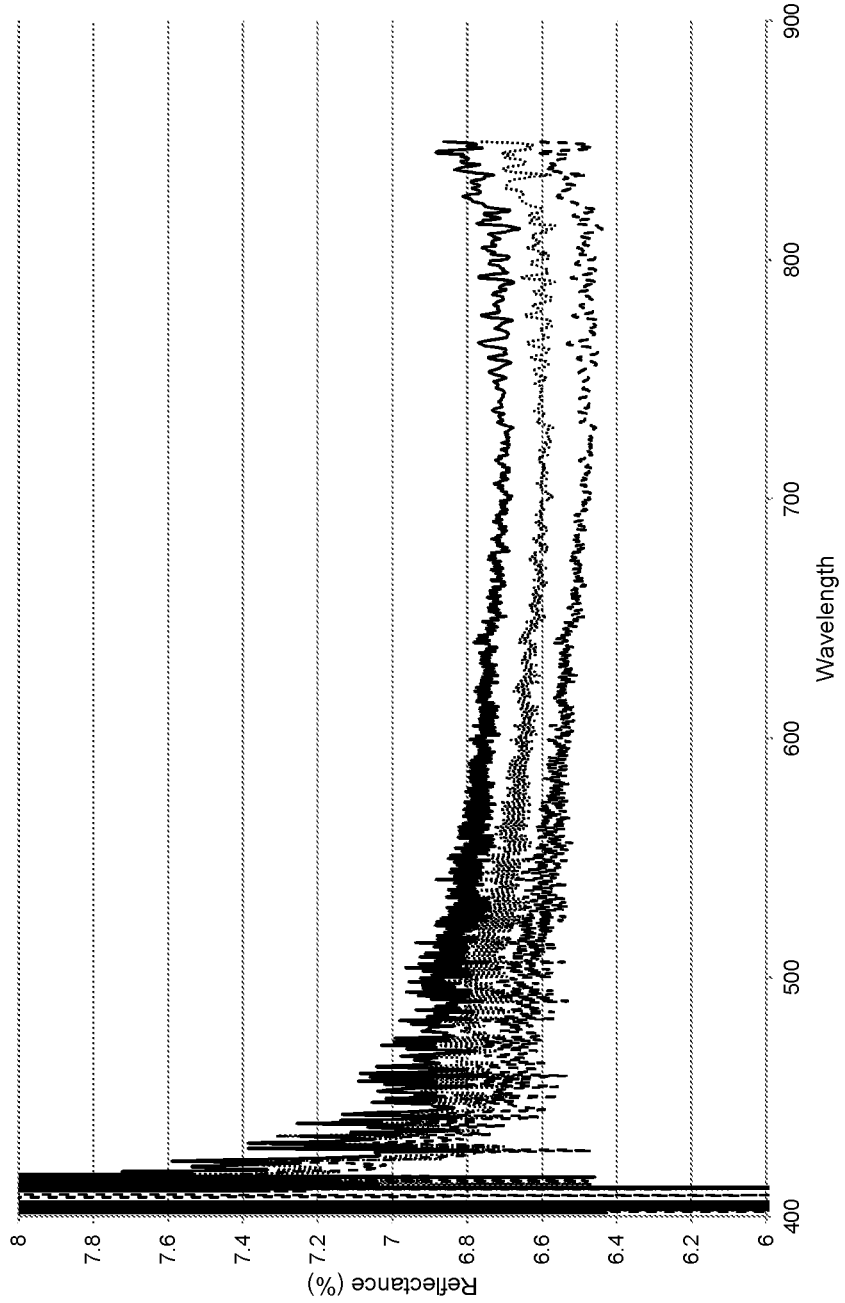
Figure 10A:
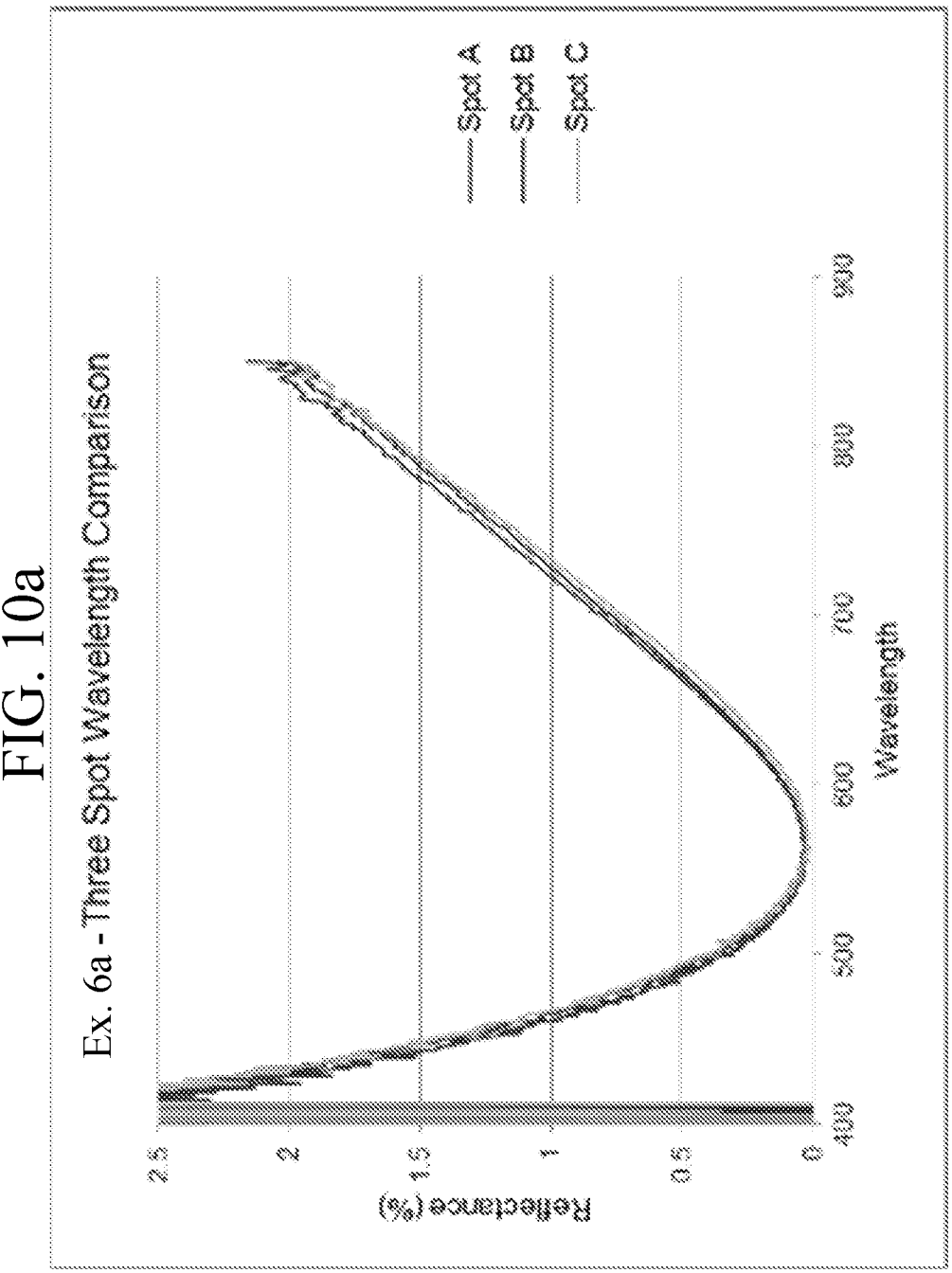
FIGS. 10a-10h graphically illustrates the reflection spectra of various articles after tube furnace treatment in accordance with EXAMPLE 6.
Figure 10B:
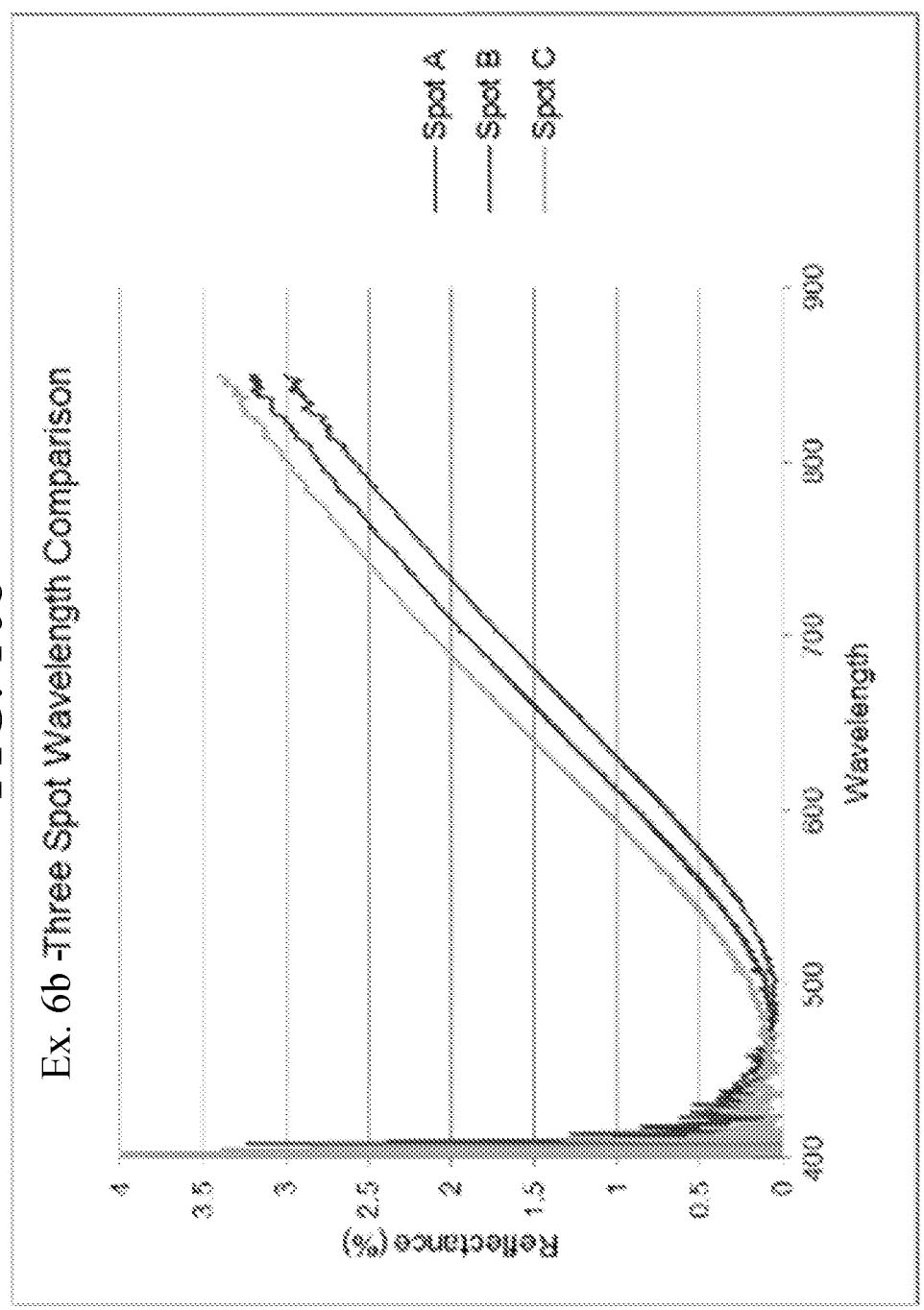
Figure 10C:
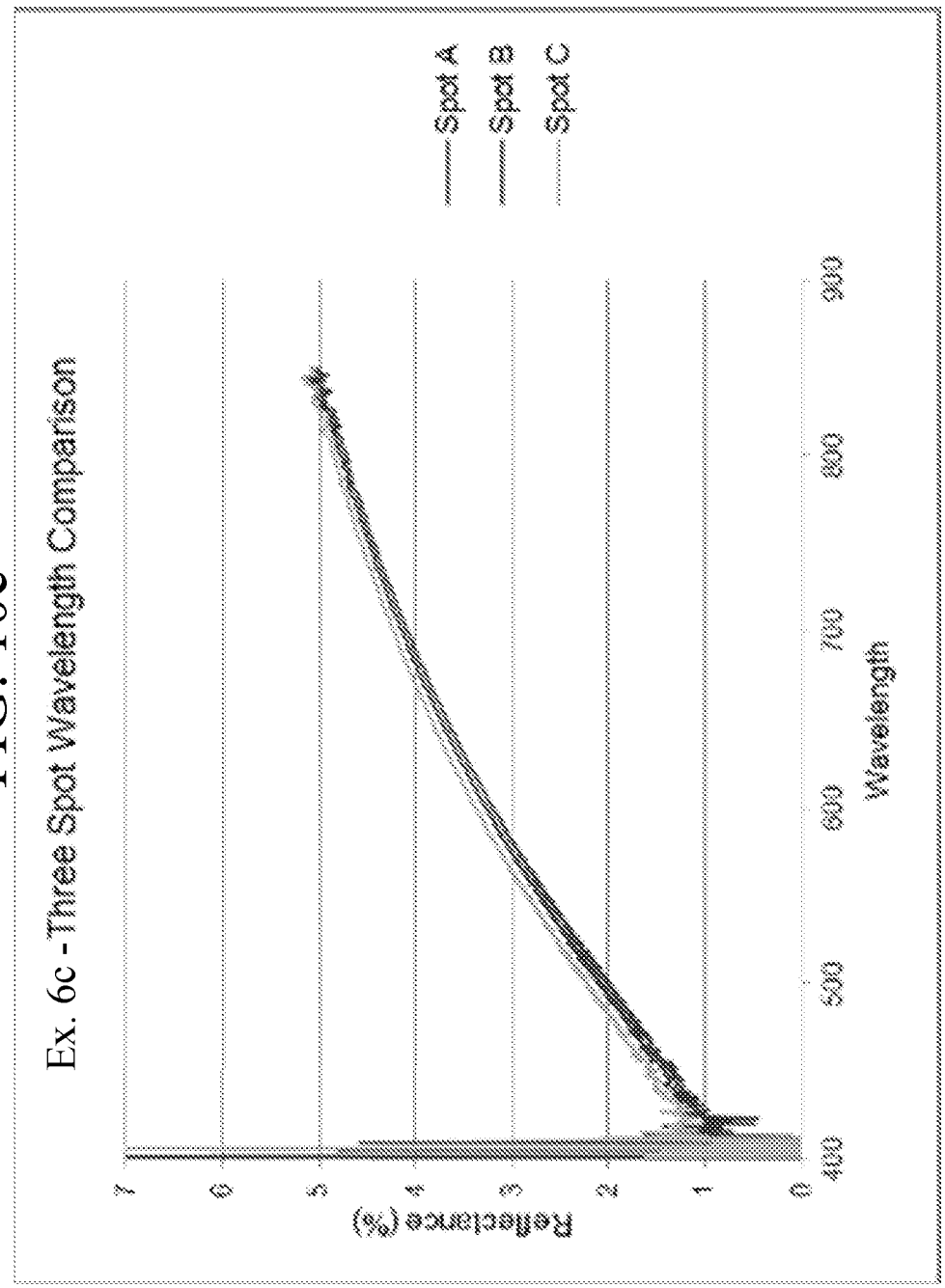
Figure 10D:
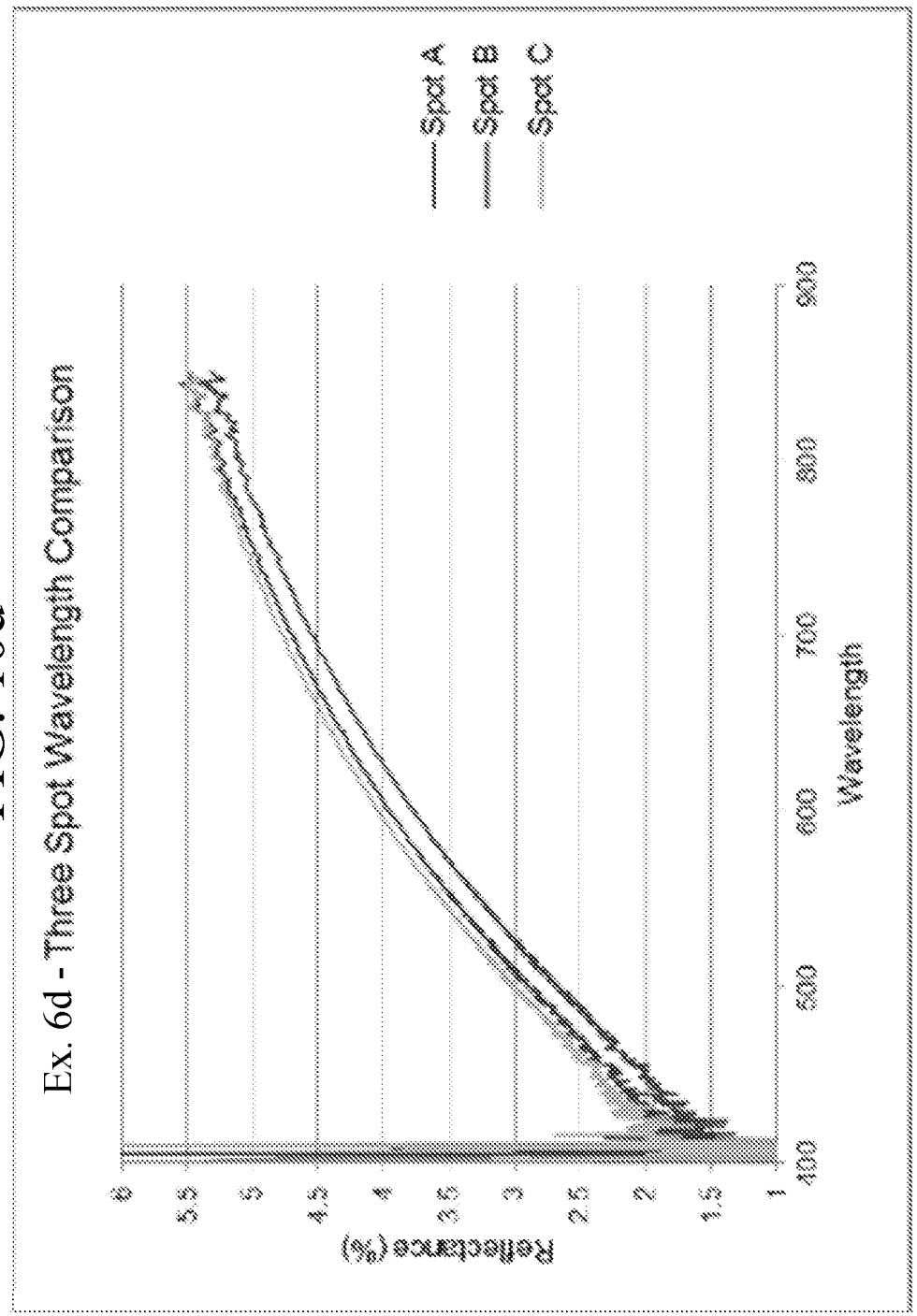
Figure 10E:
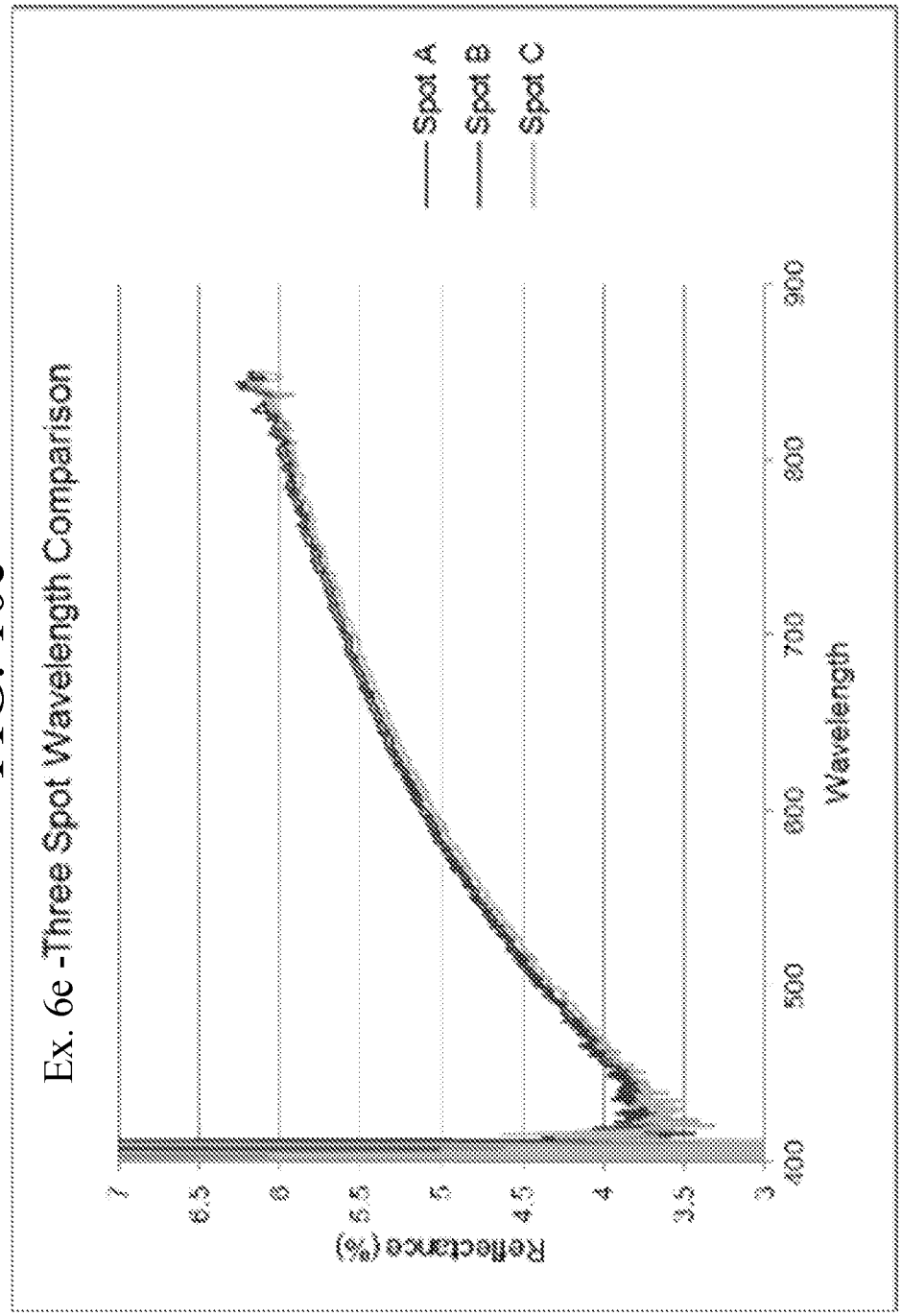
Figure 10F:
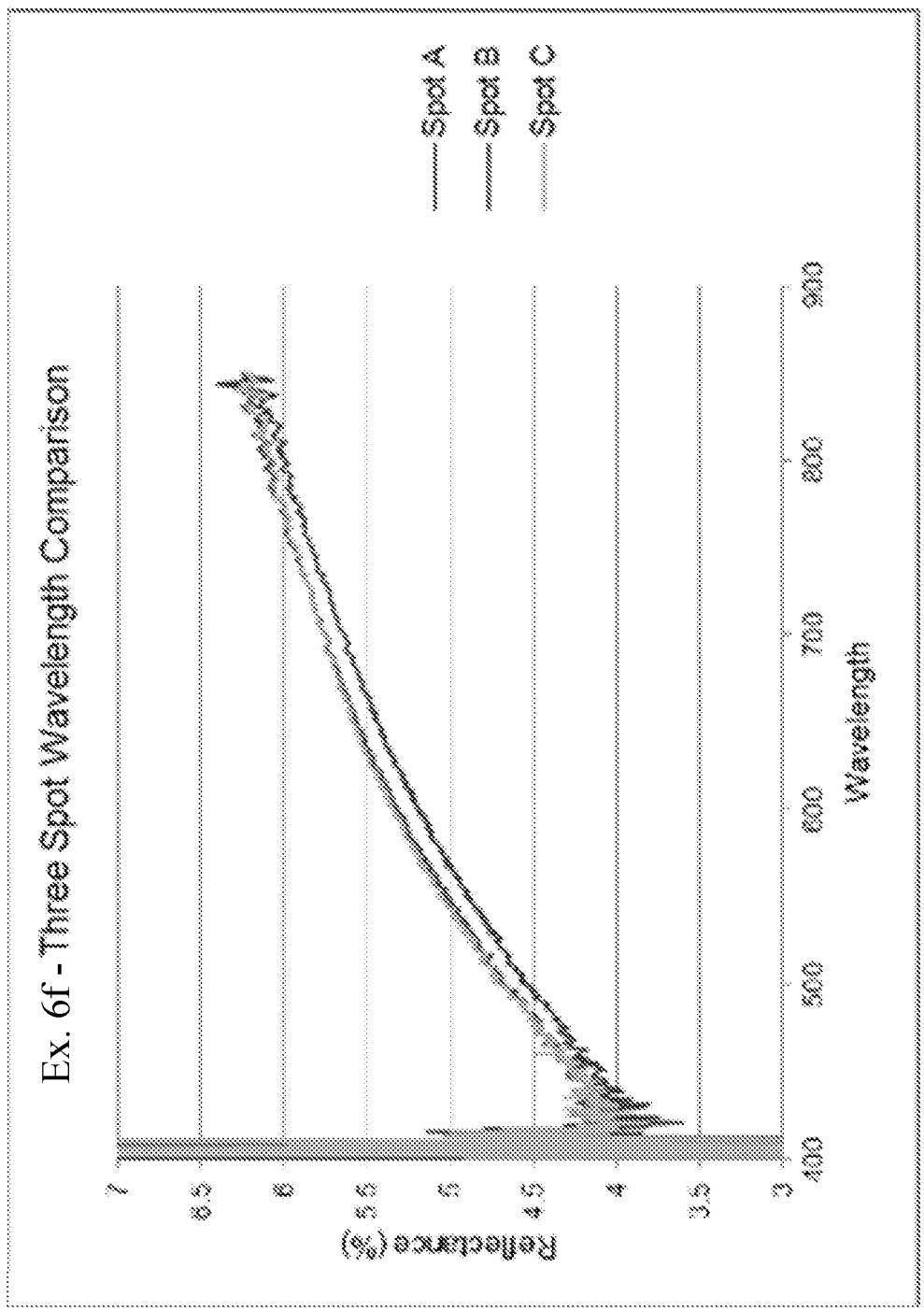
Figure 10G:
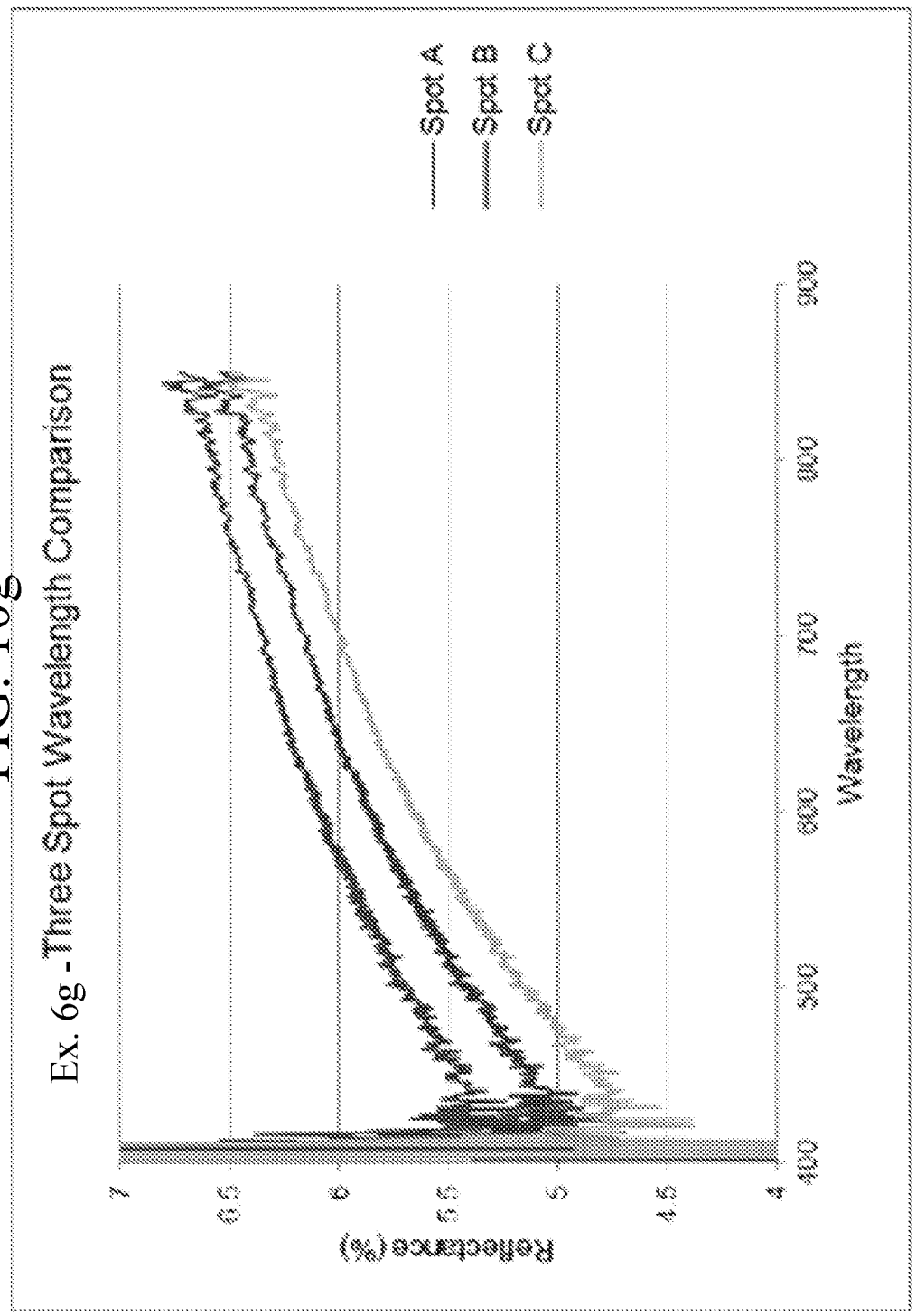
Figure 10H:
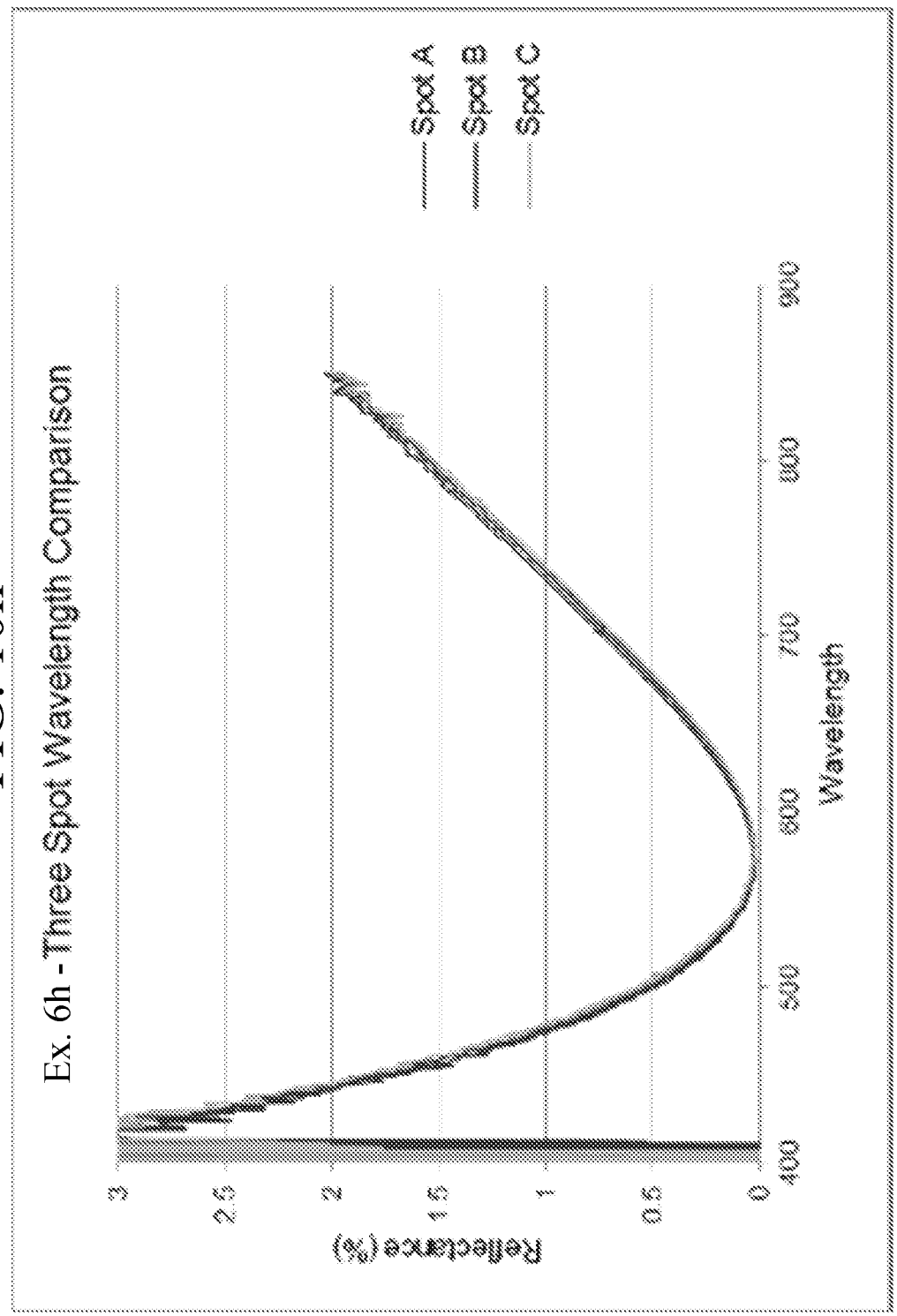

Two 2×2" samples of 0.7 mm thick glass substrates having the same composition as the glass substrates of Example 1 were coated with a randomly packed monolayer of 200 nm diameter silica spheres by dip-coating from a 10% colloidal solution in IPA. The samples were hydrothermally treated with water vapor at about 600° C. (steam), at normal atmospheric pressure for 2.5 hours (Example 3A) and 3 hours (Example 3B), respectively. FIG. 8 shows the total (the sum of specular and diffuse) reflection spectra for Examples 3A and 3B. FIG. 8 also shows the lowest average reflection in the visible wavelength range (390 nm to 790 nm) can reach as low as 0.34% (per side) at 550 nm. It was observed that the degree of fusion increases with increasing hydrothermal treatment time and therefore, the thickness of the truncated particle layer remaining above the glass substrate surface decreases. As shown in FIG. 8, the minimum reflection wavelength correspondingly shifts to shorter (blue) wavelengths. FIG. 9 shows the specular-only reflection spectrum for Example 3A on one side. As shown in FIG. 9, the specular reflection is lower than the total reflection. Specifically, the specular reflection was 0.25% at 550 nm while total reflection was 0.34% at 550 nm. Moreover, the specular reflection was 0.7% at 450 nm while total reflection was 0.8% at 450 nm. This indicates that diffuse reflection is non-negligible.

Haze was measured as an indicator of the strength of diffuse reflection for Example 3A, using an instrument supplied by Paul N. Gardner Company, Inc. under the tradename Haze-Gard. Haze was measured at 0.68% total or 0.34% per side, which is well below acceptable level of haze for applications such as display applications (e.g., 1%). The total transmission of Example 3A was 98.4% and the total transmission of Example 3B was 98.5%. Both total transmission measurements were obtained using the same instrument used to determine haze. Both Example 3A and 3B were measured for durability using a pencil hardness test and achieved a 6H level under that test.

Example 4

Densification of Colloidal Silica Nanoparticles Used to Manufacture Reduced Reflection Articles Three samples of the powder of colloidal silica nanoparticles that may be used in manufacturing reduced reflection articles according to the present invention were prepared by drying the IPA colloidal solution in vacuum. Example 4a was not subjected to any additional treatment. Example 4b was hydrothermally treated with water vapor at about 600° C. (steam), at normal atmospheric pressure for 2 hours. Example 4c was treated with nitrogen gas at about 600° C. (steam), at normal atmospheric pressure for 2 hours. The surface area measured for the samples after treatment is provided in Table 1.

TABLE 1

Surface Area Measurements for Examples 4a-4c.

| Sample ID | Sample Weight (g) | Bet (multi-point) Surface Area (m²/g) | Single Point Surface Area (m²/g) | BJH Cumul. Surf. Area of Pores (m²/g) | BJH Cumulative Pore Volume (cm³/g) | BJH Average Pore Diameter (Å) |
|---|---|---|---|---|---|---|
| As is (Example 4a) | 1.2558 | 31.1854 | 30.7794 | 38.5494 | 0.228011 | 236.592 |
| Steam 600° C. (Example 4b) | 1.9192 | 26.8805 | 26.4825 | 36.9671 | 0.223954 | 242.329 |
| N2 600° C. (Example 4c) | 1.5661 | 30.5898 | 30.0295 | 37.6751 | 0.225514 | 239.43 |

As shown in Table 1, the particles of Examples 4b and 4c experience measurable densification. The densification is more pronounced in Example 4b. The cumulative pore volume decreased by 1% after treatment with nitrogen and 2% after hydrothermal treatment. The total surface area (a measure of the overall porosity) decreased by 2% after treatment with nitrogen but decreased by as much as 14% after hydrothermal treatment. Without being bound by theory, this densification may cause increasing gaps between individual particles that have been observed in top-view top-view SEM images comparing convex features before and after hydrothermal treatment. This densification is believed to improve the durability of the articles and the convex features described herein.

Example 5

Hydrothermal Treatment Temperature Sensitivity of Reduced Reflection Articles

Six 2×2" samples of 0.7 mm thick glass substrates having the same composition as the glass substrates of Example 1 were coated with a randomly packed monolayer of 200 nm diameter silica spheres by dip-coating from a 10% colloidal solution in IPA All six samples were hydrothermally treated with water vapor at normal atmospheric pressure for 2 hours. The temperature of the water vapor was varied among the samples from about 600° C. to about 650° C., in 10° C. increments, as shown in Table 2. The specular reflection spectra was measured after hydrothermal treatment and shown in FIGS. 9a-9f.

TABLE 2

Specular Reflection Spectra for Examples 5a-5f.

| Sample | Hydrothermal Treatment Temperature (° C.) |
| --- | --- |
| Example 5a | 600 |
| Example 5b | 610 |
| Example 5c | 620 |
| Example 5d | 630 |
| Example 5e | 640 |
| Example 5f | 650 |

According to the spectra shown in FIGS. 9a-9f, the hydrothermal treatment process may be sensitive to variations in temperature. While the hydrothermal treatment at 600° C. for 2 hours is capable of fusing the lower portions of the particles (i.e., about 20% of the diameter of the particles) into the substrate, hydrothermal treatment for the same duration but at 650° C. produces the spectrum characteristic of an almost flat surface, or an article in which the particles have nearly disappeared by sinking into the underlying substrate. Moreover, for hydrothermal treatment at temperatures of about 630° C. and greater, visible distortion or warp of the substrate was observed. In one or more embodiments, the hydrothermal treatment temperature that achieves the fastest fusion without causing substrate warp may be approximately the same or close to the annealing point of the glass substrate.

Example 6

Hydrothermal Treatment Water Content Sensitivity of Reduced Reflection Articles

Eight 2×2" samples of 0.7 mm thick glass substrates having the same composition as the glass substrates of Example 1 were coated with a randomly packed monolayer of 100 nm diameter silica spheres by dip-coating from a 3% colloidal solution in IPA The eight samples were then hydrothermally treated in tube furnace to determine the sensitivity of the fusion process to water content (or proportion of air and water vapor in the furnace environment) utilized. Each of the eight samples was hydrothermally treated at a temperature of 600° C., and the treatment time was the same (i.e., 30 minutes) for all eight samples. The water content of the water and air mixture flowing through the tube furnace was modified for each of the eight samples, as shown in Table 3.

TABLE 3

Water content used in hydrothermal treatment of Examples 6a-6h.

| Sample | Water content |
| --- | --- |
| Example 6a | 0% |
| Example 6b | 18% |
| Example 6c | 41.6% |
| Example 6d | 51.5% |
| Example 6e | 70.4% |
| Example 6f | 79.5% |
| Example 6g | 100% |
| Example 6h | Control - no hydrothermal processing performed. |

FIGS. 10a-10h show the evolution of reflection spectra after hydrothermal treatment as the water content of the air and water mixture flowing through the tube furnace changes. As shown in FIGS. 10a-10h, there is a relationship between the hydrothermal treatment process speed and water content. Using a rough approximation of a single layer coating partially consisting of air (i.e., a layer of truncated silica spheres with approximately 70% surface coverage), it can be concluded that the degree of fusion between the particles and surface (measured as the change in the effective thickness of the layer due to sphere submersion) is increasing in the approximately linear proportion to water content. According to this observation, to speed up the fusion of the particles to the glass substrate, the water content should be kept as close as possible to 100%.

The results from Example 6, obtained using the tube furnace where the gas (or water vapor) constantly flows along the tube, were compared to fusion results obtained using conventional muffle furnace (without forced convection). The comparison results suggest that fusion also proceeds faster with the gas flowing.

Example 7

Water Etching of Reduced Reflection Articles

Two 2×2" samples of 0.7 mm thick glass substrates having the same composition as the glass substrates of Example 1 were coated with a randomly packed monolayer of 200 nm diameter silica spheres by dip-coating from a 10% colloidal solution in IPA. The two samples were hydrothermally treated at 600° C. for two hours. One sample was not further treated (Example 7a) and one sample was etched for 2 minutes in DI water at 80° C. (Example 7b).

Figure 11A:
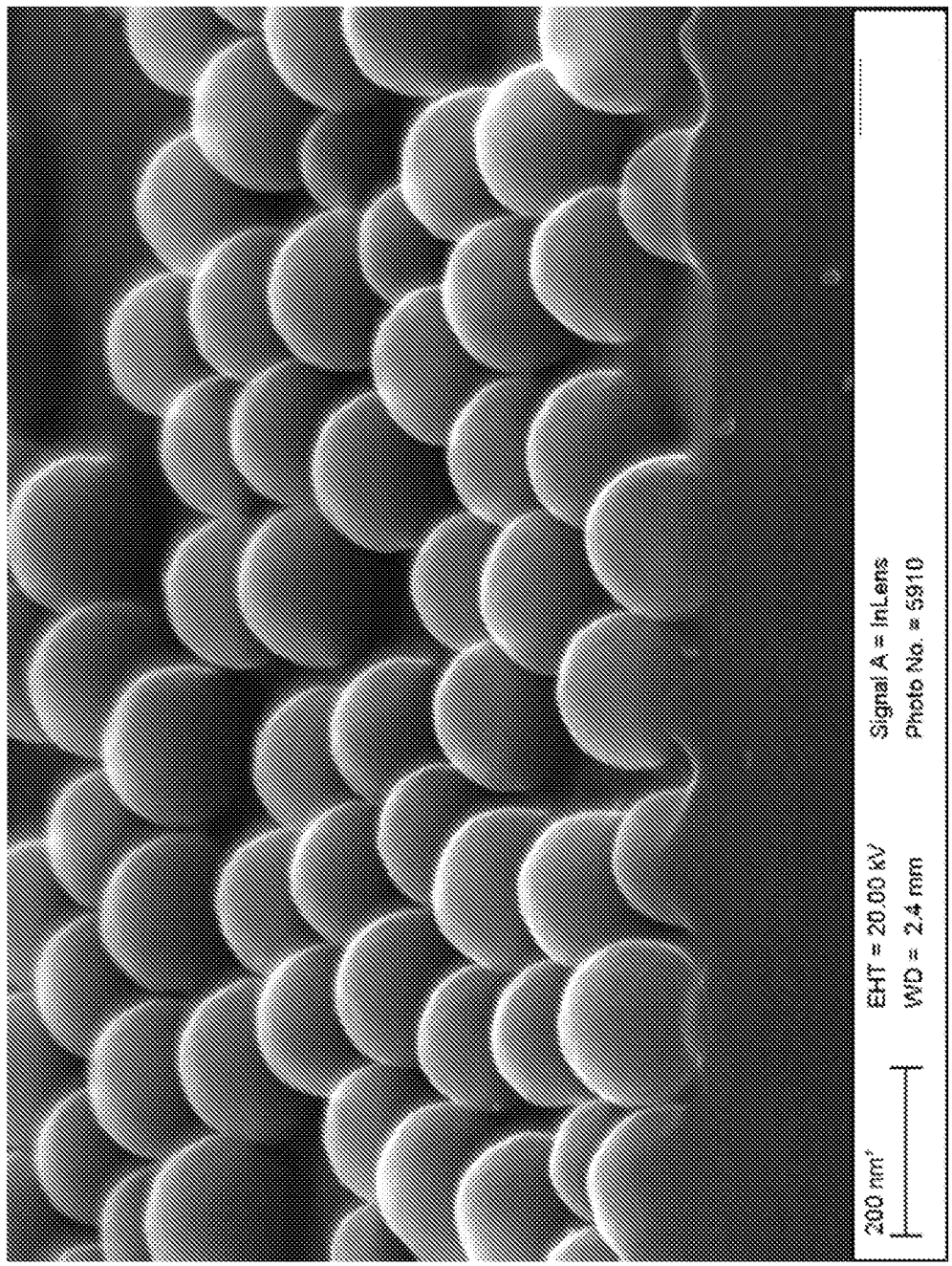
FIGS. 11a-11b are SEM images of a monolayer of silica nanoparticles having a diameter of 200 nm fused with a glass substrate after etching in accordance with EXAMPLE 7.
Figure 11B:
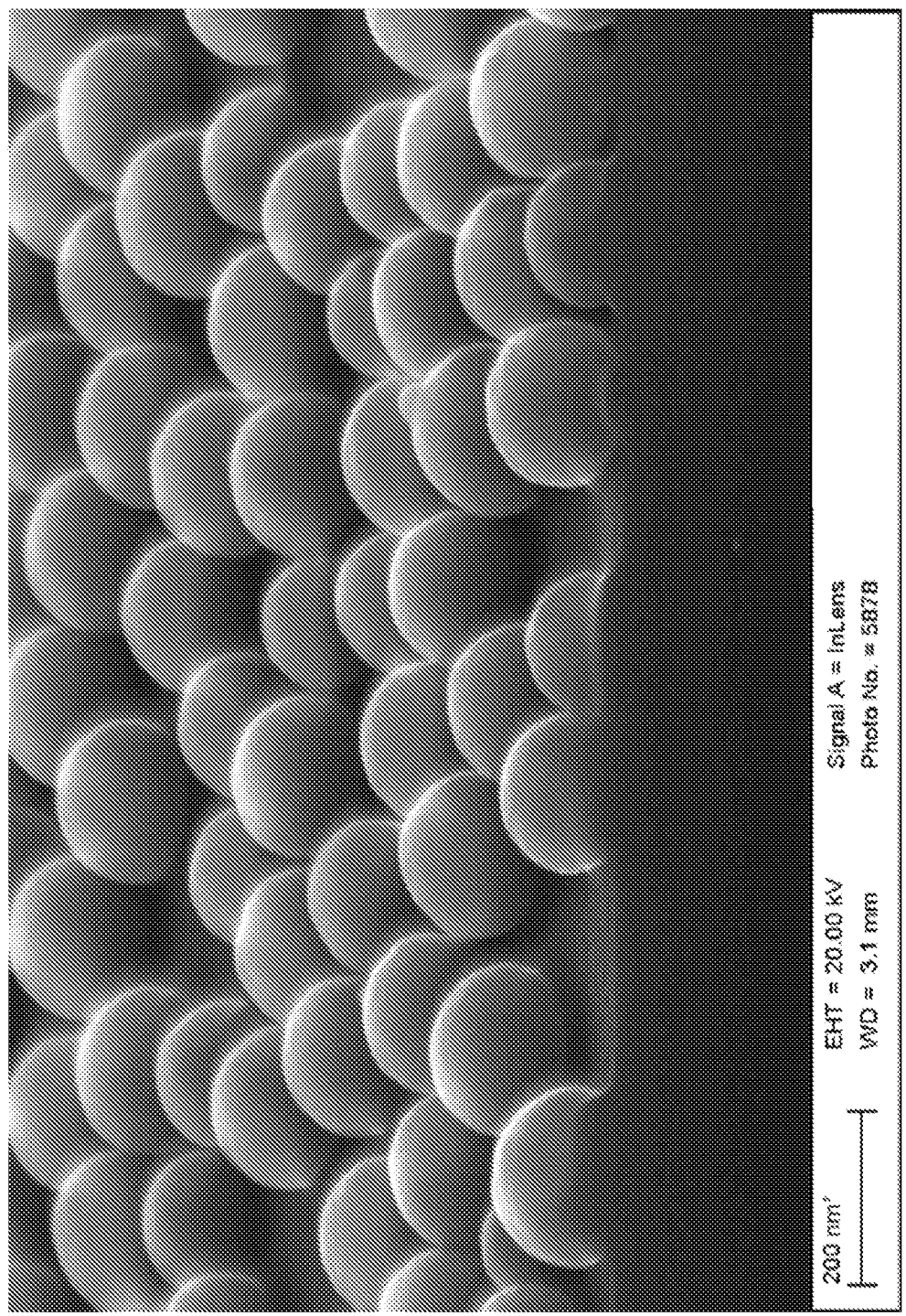

FIGS. 11a and 11b are cross-sectional SEM images of Examples 7a and 7b. FIG. 11b shows a small amount of the glass substrate material was removed from the surface after etching with water, indicating that a water-soluble and highly hydrated glass layer is present on the top of the glass substrate, extending from the surface into the glass substrate at a depth of about 10 nm.

In a subsequent experiment a sample identical to Example 7a was washed for 10 minutes in water having a temperature of about 80° C. (Example 7c). The haze of Example 7c was evaluated using an instrument supplied by Paul N. Gardner Company, Inc. under the tradename Haze-Gard before and after washing. The haze decreased after washing by about 0.5%, from 2.9% to 2.47%, and the total transparency increasing by more than 1%, from 95.8% (before washing) to 97.2% (after washing) where the convex features were present on both sides of the glass substrate (i.e., two-side coating). The hydrothermal treatment is believed to result in the formation of small inclusions of sodium oxide (or sodium hydroxide, or some form of sodium silicate) in the particulate coating, which are invisible under an optical microscope and difficult to detect even under an electron microscope. Without being bound by theory, these inclusions, though small, cause light scattering until they are dissolved by hot water during the washing step.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A reduced reflection glass article, comprising:
   a glass substrate; and
   an integral reduced reflection component comprising a plurality of sub-wavelength-sized convex features that are arranged in a monolayer at and fused with at least a portion of a surface of the glass substrate, and at least a portion of the sub-wavelength-sized convex features extend below the surface of the glass substrate,
   wherein the reduced reflection glass article has a specular reflectance that is less than or equal to about 85 percent of a specular reflectance of the glass substrate alone when measured at wavelengths of about 450 nanometers to about 750 nanometers, and
   wherein the glass substrate includes a surface layer that exhibits a lower glass transition temperature than the remaining portion of the glass substrate.

2. The reduced reflection glass article of claim 1, wherein the plurality of sub-wavelength-sized convex features comprises spherical or substantially spherical nanoparticles of an oxide material.

3. The reduced reflection glass article of claim 1, wherein the glass substrate comprises a silicate glass, borosilicate glass, aluminosilicate glass, or boroaluminosilicate glass, which optionally comprises an alkali or alkaline earth modifier.

4. The reduced reflection glass article of claim 1, wherein the glass substrate comprises a surface portion extending from a surface of the glass substrate into the glass substrate having a greater OH concentration than the remaining portion of the glass substrate.

5. The reduced reflection glass article of claim 1, wherein the glass substrate has an average thickness of less than or equal to about 2 millimeters.

6. The reduced reflection glass article of claim 1, wherein the reduced reflection glass article comprises a portion of a touch-sensitive display screen or cover plate for an electronic device, a non-touch-sensitive component of an electronic device, a surface of a household appliance, or a surface of a vehicle component.

7. The reduced reflection glass article of claim 1, further comprising a specular reflectance of less than 4 percent across the spectrum comprising wavelengths of about 450 nanometers to about 750 nanometers.

8. The reduced reflection glass article of claim 7, further comprising a specular reflectance of less than 4 percent across the spectrum comprising wavelengths of about 450 nanometers to about 750 nanometers after disposing a contaminant comprising oil on the surface of the glass substrate.

9. The reduced reflection glass article of claim 1, wherein the reduced reflection glass article has an optical transmission of at least about 94 percent across the spectrum comprising wavelengths of about 450 to about 750 nanometers.

10. The reduced reflection glass article of claim 1, wherein the reduced reflection glass article has a haze of less than or equal to about 1 percent when measured in accordance with ASTM procedure D1003.

11. The reduced reflection glass article of claim 1, wherein the reduced reflection glass article exhibits a scratch resistance of at least 6H when measured in accordance with ASTM test procedure D3363-05.

12. The reduced reflection glass article of claim 1, wherein the specular reflectance of the reduced reflection glass article varies by less than about 5 percent after 100 wipes using a Crockmeter, and varies by less than about 10 percent after 5000 wipes using the Crockmeter from an initial measurement of the specular reflectance of the reduced reflection glass article before a first wipe using the Crockmeter.

13. The reduced reflection glass article of claim 1, further comprising a surface dried at a temperature of about 100 degrees Celsius or greater in a gaseous environment including a combined water vapor content and oxygen content of less than about 1%.

14. The reduced reflection glass article of claim 1, wherein a longest cross-sectional dimension of each of said plurality of convex features in a direction parallel to the surface of the glass substrate is less than 450 nanometers.

15. A method of making reduced reflection glass article, the method comprising:
   forming an integral reduced reflection component on at least a portion of a surface of a glass substrate, wherein the integral reduced reflection component comprises a plurality of sub-wavelength-sized convex features that are arranged in a monolayer,
   wherein forming the integral reduced reflection component comprises:
      disposing the plurality of convex features on the surface; and
      hydrothermally treating the glass substrate with the plurality of convex features disposed thereon to fuse the plurality of convex features to the glass substrate, such that at least a portion of the convex features extend below the surface of the glass substrate.

16. The method of claim 15, further comprising wetting the substrate and the plurality of convex features with water, a high pH solution, or an amine solution.

17. The method of claim 15, wherein hydrothermally treating the glass substrate with the plurality of convex features disposed thereon comprises either one or both:
   placing the substrate with the plurality of convex features disposed thereon in a vessel or chamber, exposing the substrate with the plurality of convex features disposed thereon to at least one of an elevated temperature, relative humidity, and pressure, and exposing the substrate with the plurality of convex features disposed thereon to a reactive vapor.

18. The method of claim 17, wherein exposing the substrate with the plurality of convex features disposed thereon to at least one of an elevated temperature, relative humidity, and pressure comprises either one or both:

exposing the substrate with the plurality of convex features disposed thereon to a temperature in the range from about 100 degrees Celsius to a temperature less than the softening point of the glass substrate in a gaseous environment including at least about 50 percent water vapor, and ambient pressure, and exposing the substrate with the plurality of convex features disposed thereon to a temperature in the range from about 100 degrees Celsius to slightly below the softening temperature of the substrate glass, an initial relative humidity of at least about 50%, and a pressure greater than about 1 atmosphere, wherein the treatment vessel is a sealed pressure vessel.

19. The method of claim 18, further comprising exposing the glass substrates with the plurality of convex features disposed thereon to oxygen-free gas with water content of less than 1% at temperature in the range from about 100 degrees Celsius and a temperature less than the softening point of the glass substrate.

20. A reduced reflection glass article, comprising:

a glass substrate;

an integral reduced reflection component comprising a plurality of sub-wavelength-sized convex features; and a non-adhesive intermediate layer interposed between the glass substrate and the integral reduced reflection component, wherein the plurality of sub-wavelength-sized convex features are arranged in a monolayer at and fused by a hydrothermal treatment with at least a portion of a surface of the non-adhesive intermediate layer, and at least a portion of the sub-wavelength-sized convex features extend below the surface of the non-adhesive intermediate layer, and wherein the reduced reflection glass article has a specular reflectance that is less than or equal to about 85 percent of a specular reflectance of the glass substrate alone when measured at wavelengths of about 450 nanometers to about 750 nanometers.

21. The reduced reflection glass article of claim 20, wherein the non-adhesive intermediate layer comprises a glare-resistant coating, a color-providing composition, or an opacity-providing composition.

* * * * *